United States Patent
Roesener et al.

(10) Patent No.: US 11,565,288 B2
(45) Date of Patent: Jan. 31, 2023

(54) SYSTEMS, APPARATUSES, AND METHODS FOR IN-CONTAINER WASTE TREATMENT

(71) Applicant: Studsvik, Inc., Atlanta, GA (US)

(72) Inventors: W. Scott Roesener, Douglasville, GA (US); James Robert Manseill, Sandy Springs, GA (US); Matt Van Der Sluys, Lawrenceville, GA (US)

(73) Assignee: Studsvik, Inc., Atlanta, GA (US)

( * ) Notice: Subject to any disclaimer, the term of this patent is extended or adjusted under 35 U.S.C. 154(b) by 0 days.

(21) Appl. No.: 16/938,448

(22) Filed: Jul. 24, 2020

(65) Prior Publication Data
US 2021/0316344 A1 Oct. 14, 2021

Related U.S. Application Data

(60) Provisional application No. 63/008,321, filed on Apr. 10, 2020.

(51) Int. Cl.
| | | |
|---|---|---|
| *B01J 3/02* | (2006.01) | |
| *B01J 3/04* | (2006.01) | |
| *B09B 3/40* | (2022.01) | |
| *B09B 3/20* | (2022.01) | |
| *B01J 3/00* | (2006.01) | |
| *B01J 3/03* | (2006.01) | |
| *B09B 3/00* | (2022.01) | |
| *G21F 9/32* | (2006.01) | |

(52) U.S. Cl.
CPC .............. *B09B 3/40* (2022.01); *B01J 3/002* (2013.01); *B01J 3/02* (2013.01); *B01J 3/03* (2013.01); *B01J 3/04* (2013.01); *B09B 3/20* (2022.01); *G21F 9/32* (2013.01)

(58) Field of Classification Search
None
See application file for complete search history.

(56) References Cited

U.S. PATENT DOCUMENTS

| | | | | |
|---|---|---|---|---|
| 4,419,943 A * | 12/1983 | Faurholdt | ............... | F23G 5/448 110/235 |
| 4,690,180 A * | 9/1987 | Gold | ..................... | B09B 3/0058 141/51 |
| 4,863,702 A * | 9/1989 | Galloway | ................ | B01D 1/14 422/111 |
| 4,961,440 A * | 10/1990 | Wright | .................... | B65B 69/00 222/85 |
| 5,370,268 A * | 12/1994 | Adams | ...................... | B67B 7/26 222/1 |
| 5,537,940 A | 7/1996 | Nagel et al. | | |
| 5,728,310 A | 3/1998 | Loe et al. | | |

(Continued)

FOREIGN PATENT DOCUMENTS

DE   10 2010 018 241   10/2011

OTHER PUBLICATIONS

International Search Report and Written Opinion for Patent Application No. PCT/US2020/062698, dated Feb. 25, 2021.

*Primary Examiner* — Jennifer A Leung
(74) *Attorney, Agent, or Firm* — King & Spalding

(57) ABSTRACT

The present invention provides systems, apparatuses, and methods for the treatment of containerized waste, such as hazardous, radioactive and/or mixed waste. The apparatuses and methods employ a combination of thermal decomposition and specialized lances.

20 Claims, 12 Drawing Sheets

(56) References Cited

U.S. PATENT DOCUMENTS

| | | | | |
|---|---|---|---|---|
| 5,730,193 A | * | 3/1998 | Sparks | B09B 3/0058 |
| | | | | 141/329 |
| 5,767,422 A | * | 6/1998 | Brassell | B09B 1/00 |
| | | | | 73/864.74 |
| 5,841,038 A | * | 11/1998 | Volz | B67B 7/24 |
| | | | | 73/863.85 |
| 6,155,182 A | | 12/2000 | Tsangaris et al. | |
| 6,355,904 B1 | | 3/2002 | Batdorf et al. | |
| 6,552,295 B2 | * | 4/2003 | Markunas | H05H 1/46 |
| | | | | 110/246 |
| 7,491,861 B2 | | 2/2009 | Mason | |
| 7,763,219 B2 | | 7/2010 | Mason | |
| 2004/0024279 A1 | * | 2/2004 | Mason | G21F 9/32 |
| | | | | 588/317 |
| 2007/0128079 A1 | * | 6/2007 | Counts | G01N 1/04 |
| | | | | 422/400 |
| 2014/0066686 A1 | | 3/2014 | Deegan et al. | |
| 2019/0351090 A1 | | 11/2019 | Guirette et al. | |

\* cited by examiner

SYSTEMS, APPARATUSES, AND METHODS FOR IN-CONTAINER WASTE TREATMENT

CROSS-REFERENCE TO RELATED APPLICATION

This application claim priority to U.S. Provisional Patent Application No. 63/008,321, filed Apr. 10, 2020, the entirety of which is incorporated herein.

FIELD OF THE ART

The present invention relates to a system, apparatus, and method for in-container waste treatment employing lances.

BACKGROUND

Thermal decomposition is well known for use in processing hazardous waste, including organic and radioactive wastes. For several decades, thermal decomposition has been used in converting organic materials, such as biomass and municipal solid waste, into a synthesis gas, otherwise called syngas, that is rich in carbon monoxide, carbon dioxide, hydrogen, and light hydrocarbons. The syngas can thereafter be used to drive an engine, turbine, or boiler to generate power. Modern thermal decomposition systems have been built to process municipal solid waste at rates reaching several hundred tons of waste per day.

The thermal decomposition process is, therefore, well developed and well understood. Further, it is known to employ thermal decomposition for use in processing hazardous wastes in containers, typically drums, which avoids the bulk handling of these wastes. However, current methods employing these processes suffer from a number of disadvantages. For example, a majority of the methods using thermal decomposition typically introduce hot gases into the system to heat the waste. If hot, high volume heating gases are present in a method, the gas flow and gas composition within the system are more difficult to control. Other methods employing thermal decomposition use internal combustion fired heat. These methods are generally incineration processes, which are becoming unacceptable from an environmental standpoint. Incinerators and related processes that utilize open-flame combustion fall under stringent and comprehensive air pollution laws that typically render the incinerators economically infeasible. Another disadvantage is that the gas is introduced into the autoclave unit not within the container itself; thus, the transfer of reaction gas to the materials within the container is very inefficient.

There exist many containers of waste created and stored, sometimes for years, because safe and efficient means for processing the waste is not available. The contents of such containers may be poorly characterized, encapsulated (e.g., in cement-like binders), contain mixtures of oxidizers and organics that require greater control of the thermal decomposition process including the contact of reactive materials with the waste inside the container, or contain resins which leave a volume of char after treatment, and, in addition, may not be fully treated due to self-insulating effects (e.g., there is untreated resin left in the container).

There remains a need for systems, apparatus and processes for safe and efficient decomposition of such waste. In particular, systems, apparatuses and processes that can supply more information, better control, and better contact of waste and reactive materials during processing to provide safer and more complete treatment.

Containers of radioactive and hazardous waste are usually sealed such that treatment using thermal decomposition leads to pressure build-up and bursting of container walls. Bursting may lead to over-pressurization and, in the worst case, failure of the autoclave boundary. In less extreme cases, the bursting of the waste container leads to significant contamination of the interior of the autoclave, which, when processing waste containing radioactive materials, creates operational issues. Puncturing sealed waste containers outside the environment of the autoclave can lead to uncontrolled spread of radioactive and other hazardous materials. A method for puncturing the waste container inside of the sealed autoclave is desired.

The description herein of certain advantages and disadvantages of known methods is not intended to limit the scope of the embodiments.

SUMMARY

Disclosed herein are systems, apparatuses and methods for processing waste in containers, for example, drums, using thermal decomposition combined with lances designed to pierce the containers, penetrate the waste, perform monitoring functions, and provide a flow path for purge gases and reactive material directly to the waste inside the container. Materials for encapsulating the waste after treatment may also be injected using the apparatus.

Figure 1:
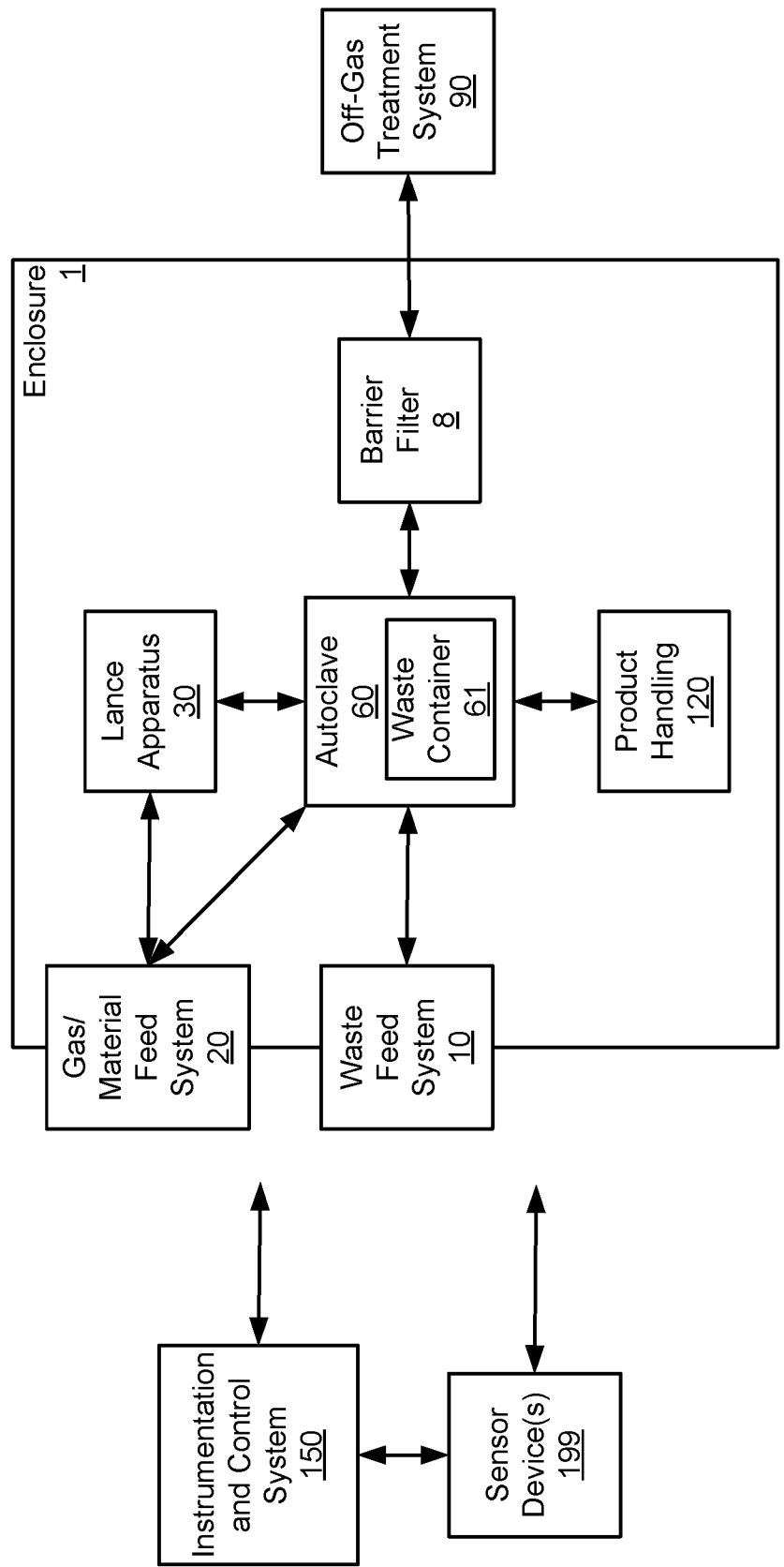
FIG. 1 is a functional block diagram illustrating the functional components of an exemplary system using lances for treating waste in-container with thermal decomposition.

Certain aspects of the inventive technology can be better understood with reference to the above drawings. The elements and features shown in the drawings are not necessarily to scale, emphasis being placed upon clearly illustrating the principles of exemplary embodiments of the present technology. Moreover, certain dimensions may be exaggerated to help visually convey such principles.

DETAILED DESCRIPTION OF EXEMPLARY EMBODIMENTS

The present invention provides systems, apparatuses and methods for the treatment of drummed or containerized waste, such as hazardous, radioactive and/or mixed waste. In particular, the systems, apparatuses and methods employ a combination of thermal decomposition and specialized lances. Exemplary lances are designed to carry out different aspects of the waste treatment, including piercing the containers, penetrating the waste, monitoring reaction progress, and delivering purge gases and reactive material directly to the waste inside a drum or container. In some embodiments, materials for encapsulating the waste after treatment may also be injected using an exemplary lance. The operation of exemplary embodiments will be described in particular with reference to waste containing chemical and physical hazards, organics, and radioactive elements. Containers of non-hazardous waste containing organic material can also be processed using the systems, apparatus and methods described herein.

Generally, the systems, apparatus and methods described herein are useful in the treatment of radioactive, hazardous and/or mixed waste. As referred to herein, "waste" means any waste or product stream that includes hazardous and/or radioactive compounds. The systems, apparatus and methods are also useful in removing organics such as plastic and wood, liquids which cause myriad problems for disposal of waste, and breaching sealed containers within the main waste container. Radioactive wastes are wastes that comprise radioactive material or radionuclides. Common sources of radioactive wastes include by-products of nuclear power generation and other applications of nuclear fission or nuclear technology, such as research and medicine. Radioactive waste is hazardous to most forms of life and the environment and is regulated by government agencies in order to protect human health and the environment. In certain embodiments, the waste to be treated by the exemplary systems, apparatus and methods is generally from nuclear facilities.

In one embodiment, the waste comprises carbonaceous or organic material. In another embodiment, the waste is encapsulated or otherwise bound, for example in a binder such as cement. In one embodiment, the waste may be dry or wet. The waste may comprise liquids, liquid slurries, sludges, solids and gases. In one embodiment, the waste is in the form of a sludge or solid. In one embodiment, the waste comprises alkali metals and/or heavy metals. In another embodiment, the waste comprises ion exchange resin, for example radioactively contaminated ion exchange resin. In one embodiment, the waste comprises sealed waste containers.

In one embodiment, the systems, apparatus and methods of the present invention can facilitate conversion of organic material contained in the waste into carbon monoxide, carbon dioxide, hydrogen, and light hydrocarbons. The gases produced by the waste treatment method can be treated in an off-gas treatment system. The treated waste remaining in the container after treatment is a dry, inert and inorganic. Treatment of the waste in the container is achieved without removing or handling wastes from the container. In one embodiment, the waste is treated in the container in which the waste was originally packaged or stored.

As referred to herein, the term "drum" or "container" refers to a container that is not particularly limited in shape, size or material. Exemplary "containers" can have any capacity (e.g., 55 gallons) and be made of one or more of a number of materials (e.g., stainless steel, plastic, concrete). Also, "containers" can have any of a number of shapes (e.g., cubic, cylindrical). For example, a container can be a 55-gallon cylindrical drum made of plastic.

A detailed description of the components attributed to each of the reference numbers can be found in the figures in which the reference numbers are shown.

Apparatuses for Treatment of Containerized Waste

In one embodiment of the invention, an apparatus for the treatment of containerized waste comprises: an autoclave 60, a lance apparatus 30, one or more lances 31, a gas/material feed system 20, one or more sensor devices 199, and an instrumentation and control system 150, wherein a waste storage container 61 containing waste is placed inside the autoclave.

In one embodiment of the invention, an apparatus for the treatment of containerized waste comprises: a waste feed system 10, an autoclave 60, a lance apparatus 30, one or more lances 31, a gas/material feed system 20, one or more sensor devices 199, and an instrumentation and control system 150, wherein a waste storage container 61 containing waste is placed inside the autoclave 60 by the waste feed system 10.

In one embodiment of the invention, an apparatus for the treatment of containerized waste comprises: a waste feed system 10, an enclosure 1, an autoclave 60, a lance apparatus 30, one or more lances 31, a gas/material feed system 20, one or more sensor devices 199, an instrumentation and control system 150, a product handling system 120, a barrier filter 8 and an off-gas treatment system 90, wherein a waste storage container 61 containing waste is placed inside the autoclave 60 by the waste feed system 10.

In one embodiment of the invention, an apparatus for the treatment of containerized waste comprises: a waste feed system 10, an enclosure 1, an autoclave 60, a lance apparatus 30 (including one or more lances 31), a gas/material feed system 20, one or more sensor devices 199, an instrumentation and control system 150, a product handling system 120, a barrier filter 8 and an off-gas treatment system 90, wherein a waste storage container 61 containing waste is placed inside the autoclave 60 by the waste feed system 10 (see FIG. 1).

In one embodiment, the lance apparatus 30 comprises one or more lances 31 for piercing or puncturing the waste storage container 61. In one embodiment, a lance 31 of the lance apparatus 30 is used for penetrating the waste. In one embodiment, the lance apparatus 30 comprises a lance 31 for providing a purge gas to the waste. In one embodiment, the lance apparatus 30 comprises a lance 31 for providing reactive materials to the waste. In one embodiment, the lance apparatus 30 comprises a lance 31 for measuring the temperature of the thermal decomposition of the waste. In one embodiment, the lance apparatus 30 comprises a lance 31 for injecting encapsulating material into the waste. In certain embodiments, the lance apparatus 30 comprises two or more lances 31. In certain embodiments, the lance apparatus 30 comprises one or more multifunction lances 31. A lance 31 of the lance apparatus 30 can be considered part of the lance apparatus 30 or a separate component that is used with the lance apparatus 30. A lance 31 can be removed from, replaced, or added to a lance apparatus 30.

In one embodiment, the lance apparatus 30 comprises a mechanism for holding and moving the lance 31. In one embodiment, the lance apparatus 30 comprises a drive mechanism to provide the motive force to the lance 31 to pierce a waste storage container 61 and to penetrate the waste inside. In one embodiment, the lance apparatus 30 comprises a seal to prevent escape of gases and particulates from the autoclave during use of lance 31.

In one embodiment, the autoclave 60 comprises an aperture with a seal to prevent escape of gasses and particulates from the autoclave 60 during use (insertion) of the lance 31.

Waste Feed System

In one embodiment, the waste feed system 10 distributes the waste storage container 61 into the enclosure 1 and into the autoclave 60 within the enclosure 1. In certain embodiments, the waste feed system 10 feeds the waste into a waste storage container 61. Once the waste storage container 61 is placed in the autoclave 60, the autoclave 60 is sealed.

Generally, the waste feed system 10 includes an overhead crane 12 or other lifting device, or another mechanism, which can move the waste storage container 61 into the enclosure 1 and into the autoclave 60. In certain embodiments, the waste feed system 10 distributes the waste storage container 61 into the enclosure 1 through an airlock 11. The term "airlock" refers to a device which permits the passage of objects between a pressure vessel and its surroundings while minimizing the change of pressure in the vessel and loss of air from it. The airlock 11 consists of a chamber with two airtight doors in series which do not open simultaneously.

The waste feed system 10 optionally comprises a radiography chamber 13 and non-destructive assay chamber 14 for analysis of the waste prior to treatment in the autoclave 60. In certain embodiments, the radiography chamber 13 and non-destructive assay chamber 14 are used for analysis of radiological content of the waste.

The waste feed system 10 is also used to move the waste container 61 out of the autoclave 60 after treatment. In certain embodiments, the radiography chamber 13 and non-destructive assay chamber 14 can be used to assess remaining radiological content after treatment of the waste.

Waste Storage Container

The waste storage container 61 includes one or more walls that form a container cavity. The container cavity of the waste storage container 61 can be completely enclosed or may sometimes be fitted with a small filter.

In certain embodiments, the waste in the waste storage container 61 comprises alpha-particle-emitting radionuclides, highly radioactive waste and/or other hazardous material.

In certain embodiments, the waste in the waste storage container 61 comprises reactive metals and compounds which may be converted into stable compounds for disposal by the systems, apparatus and methods described herein.

Such compounds, include, but are not limited to, sodium, potassium, calcium, magnesium, uranium, cyanide, and other reactive compounds that can burn, ignite, or explode when exposed to certain other materials or when exposed to varied environmental conditions. In certain embodiments, the reactive metals present in the waste are strongly reducing when heated above 500° C. Examples of stable compounds produced include $NaCl$, $Na_2CO_3$, $Na_2SO_3$, $KCl$, $K_2CO_3$, $K_2SO_3$, $CaO$, $CaCO_3$, $CaCl_2$, $CaSO_3$, $U_2O_3$, $U_3O_8$, $MgO$, $MgCl_2$, $MgCO_3$, and $MgSO_3$. In one embodiment, metallic uranium fuel pieces are substantially converted into inert, non-reactive uranium oxide metal. Cyanides, if present, will volatize from the waste and will oxidize in the steam reformer to water, carbon dioxide, and nitrogen.

In certain embodiments, the systems, apparatus and methods described herein are useful for the conversion of nitrogen-containing wastes into stable compounds for disposal. Exemplary nitrogen-containing wastes include, but are not limited to, NOx compounds, liquid nitrogen-containing mixtures with flash points of less than 60° C., and aqueous liquids with a pH of less than 2 or greater than 12.5. Examples of stable compounds produced include $NaCl$, $Na_2CO_3$, $Na_2SO_3$, $KCl$, $K_2CO_3$, $K_2SO_3$, $CaO$, $CaCO_3$, $CaCl_2$, $CaSO_3$, $MgO$, $MgCl_2$, $MgCO_3$, and $MgSO_3$.

Enclosure

The enclosure 1 is a structure which houses or encompasses the autoclave. The design (e.g., shape, size, material) of the enclosure 1 may vary with the type of waste, for example, radioactive material, in the container. The enclosure 1 is accessed by the waste feed system 10, for example by crane or other lifting device, to move the waste storage container 61 within the enclosure 1 and into the autoclave 60.

Enclosure

The enclosure 1 is a structure which houses or encompasses the autoclave 60. The design of the enclosure may vary with the type of waste, for example, radioactive material, in the container. The enclosure 1 is accessed by the waste feed system 10, and the waste is transferred within the enclosure 1 to the autoclave 60, by a crane or other lifting device.

In certain embodiments, enclosure 1 also houses the lance apparatus 30 (see FIGS. 1 and 7). In certain embodiments, the lance apparatus 30 comprising one or more lances 31 is located in part on the exterior of the enclosure 1 and passes through one or more walls of the enclosure 1.

Optionally, the enclosure 1 may also house other measuring and/or monitoring equipment, for example non-destructive assay and/or real-time radiography equipment. Such equipment may also be external to the enclosure or used previously to partially characterize the waste. Exemplary non-destructive assays include but are not limited to, gamma-ray spectrometers and neutron counters.

Optionally, the enclosure 1 may also house the product handling system 90. Such equipment may also be external to the enclosure 1. Exemplary equipment of the product handling system 90 can perform such functions as compaction and overpacking.

Autoclave

The autoclave 60 is a strong, heated container for carrying out chemical reactions and other processes using high pressures and/or high temperatures. In one embodiment, the autoclave 60 includes an inner liner 63 within an outer shell 62 which is heated by an indirect heat source using conductive or radiative heat transfer elements 64, such as electrical heaters that are external to the inner sleeve 63. The autoclave 60 can be used to thermally decompose waste in a container. The autoclave 60 can be heated in a controlled fashion to the desired temperature, for example a temperature in the range of about 200° C. to about 800° C., or a temperature wherein the liquids and organics in the waste will evaporate and volatize.

The autoclave 60 includes certain features which prevent or minimize the interchange of gas and particulates between interior and exterior of the autoclave, for example nozzles, seals and isolation devices. Various designs of these features are contemplated for use in the autoclave 60. In certain embodiments, one or more nozzles, seals or isolation devices are mounted on the autoclave lid 65. In certain embodiments, one or more nozzles, seals or isolation devices are mounted on the side of the autoclave 60.

In certain embodiments, the autoclave 60 comprises one or more nozzles 66 and isolation devices 71, which allow for passage of a lance 31 into the interior of the autoclave. In certain embodiments, the autoclave comprises a domed or flat autoclave lid 65. One or more isolation devices 71 and one or more nozzles 66 are mounted on the autoclave lid 65 to provide access of the lance 31 into the interior of the autoclave 60.

In certain embodiments, isolation device 71 is in contact with the autoclave 60 (e.g. in contact with the autoclave lid 65). The one or more lances 31 are inserted into the autoclave 60, for example through the autoclave lid 65, by passage through nozzle 66, then the isolation device 71.

The autoclave lid 65 can be remotely opened and sealed by the instrumentation and control system 150. In certain embodiments, a hydraulic mechanism is used to seal the autoclave (e.g. a hydraulic clam shell type of seal mechanism). The autoclave lid 65 design can vary but should be readily opened and closed with the isolation device 71 and nozzle 66 in place on the autoclave lid 65 of the autoclave 60. In certain embodiments, the autoclave lid 65 is attached to the autoclave 60 by a hinge mechanism.

The autoclave 60, optionally, houses a support structure (not shown in the Figures) within the autoclave inner liner 63. The support structure is configured to supply resistance to the lance 31. For example, the support structure reinforces the structure of the autoclave 60 such that when a piercing or puncturing lance 31 is used to pierce the lid of the waste container 61 or the waste inside the waste container 61, the waste container 61 is held in place without any appreciable movement. Such support structures are common in the industry and can have any of a number of configurations. In embodiment, the support structure is configured to help guide and center the waste container 61 as it is loaded into the autoclave.

Lance Apparatus

The lance apparatus 30 facilitates the positioning and insertion of lances 31 into the autoclave 60 and waste storage container 61. The lance apparatus 30 comprises lances 31 of various design, a lance drive mechanism 32, and a lance penetration mechanism 34.

The drive mechanism 32 guides the lance 31 and moves the lance 31 up and down. The drive mechanism 32 can provide enough force in most case to cause the lance 31 to pierce the lid of the waste container 61.

The penetration mechanism 34 supplies a force sufficient to cause the lance 31 to pierce the lid of the waste container 61. The penetration mechanism 34 can also supply the extra force needed for the lance 31 to penetrate the waste in the waste container 61.

In certain embodiments, the lance apparatus 30 further comprises a spool piece 35. The spool piece 35 may house a lance seal 36. The spool piece 35 is normally used when a tip 44 larger than the diameter of the shaft 46 is needed to pierce the hole in the lid of the waste container 61.

Typically, the lance apparatus 30 is contained within the enclosure 1. In certain embodiments, at least a portion of the lance apparatus 30 may be located, in part, on the exterior of the enclosure 1 to facilitate insertion of the lance 31 into the enclosure 1, the autoclave 60, and the waste storage container 61. For example, the lance drive 32 and/or piercing and penetrating mechanism 34 may be located on the outside of enclosure 1.

Lances

One or more lances 31 varying in function can be used in the lance apparatus 30. In one embodiment, a lance 31 is capable of performing one or more tasks. Generally, a lance 31 comprises a shaft 46 and a tip 44. At times, a lance 31 includes connections at the end of the shaft 46 opposite the tip 44 for monitoring and fluid supply. The design of a lance 31 can vary based on the specific function of the lance 31.

In one embodiment, a lance 31 can be used to pierce the waste storage container 61. A specialty lance 31 with the appropriately shaped tip 44 is inserted through the nozzle 69 to pierce the waste container 61. For example, when used to pierce the waste container 61, the tip 44 may be shaped, for example, like a spearhead (e.g., with or without barbs), a cone, or a point and may be the same or wider than the shaft 46 of the lance 31 at the point where the tip 44 connects to the shaft 46. The tip 44 of a lance 31 may be fashioned in any suitable shape, size, and/or other configuration. Additionally or alternatively, the tip 44 of a lance 31 may be made from any suitable material that supports the function of the lance 31.

In one embodiment, a lance 31 can be used to penetrate the waste in the waste container 61, for example waste that is mixed with or encapsulated by one or more binders, such as cement, or is otherwise hard-packed. In certain embodiments, a lance 31 comprises a lance piercing or penetrating mechanism 34 which provides the force or pressure required to pierce the waste container 61 or to penetrate the waste inside the waste storage container. The top of the lance 31 can be reinforced for transfer of the force of the penetrating mechanism to the lance shaft 46 and tip 44. In certain embodiments, a lance 31 can be used to form a hole, pocket or burrow in the waste or otherwise break up solid masses of waste. Such holes, pockets, burrows or breaks in the waste render the waste more accessible to treatment, for example treatment by purge gases and other reactants.

Generally, once the waste within the waste container 61 has been penetrated by a lance 31, egress of thermal decomposition gases from the waste container 61 proceeds or increases.

In certain embodiments, a purge of gas, such as an inert gas, is provided through a lance 31 to sweep thermal decomposition gases from the waste container 61. Gases from the gas/material feed system 20, are introduced into the lance 31 through a connection at the end of the shaft 46 opposite the tip 44, flow through channels 47 in the shaft 46, and flow out of one or more ports (e.g., ports 401, ports 403) in the side of the shaft 46. The gas then passes through the waste and out of the annular space between the shaft 46 and the hole in the lid of the waste container 61 made by the lance 31.

In certain embodiments, one or more reactive materials, for example steam, supplied by the gas/material feed system 20 flow into the lance 31 through a connection at the end of the shaft 46 opposite the tip 44, flow through channels 47 in the shaft 46, and flow out of one or more ports in the side of the shaft 46 of the lance 31. Multiple ports (e.g., ports 401, ports 403) can be installed along the length of the shaft 46 of the lance 31 to distribute flow. In certain embodiments, the ports (e.g., ports 401, ports 403) are located along portions of the shaft 46 of the lance 31 that are disposed within the waste storage container 61.

In certain embodiments, one or more stabilizing materials supplied by the gas/material feed system 20 flow into the lance 31 through a connection at the end of the shaft 46 opposite the tip 44, flow through channels 47 in the shaft 46, and flow out of one or more ports in the side of the shaft 46 of the lance 31. Multiple ports (e.g., ports 401, ports 403) can be installed along the length of the shaft 46 of the lance 31 to distribute flow. In certain embodiments, the ports (e.g., ports 401, ports 403) are located along portions of the shaft 46 of the lance 31 that are disposed within the waste storage container 61.

Figure 5:
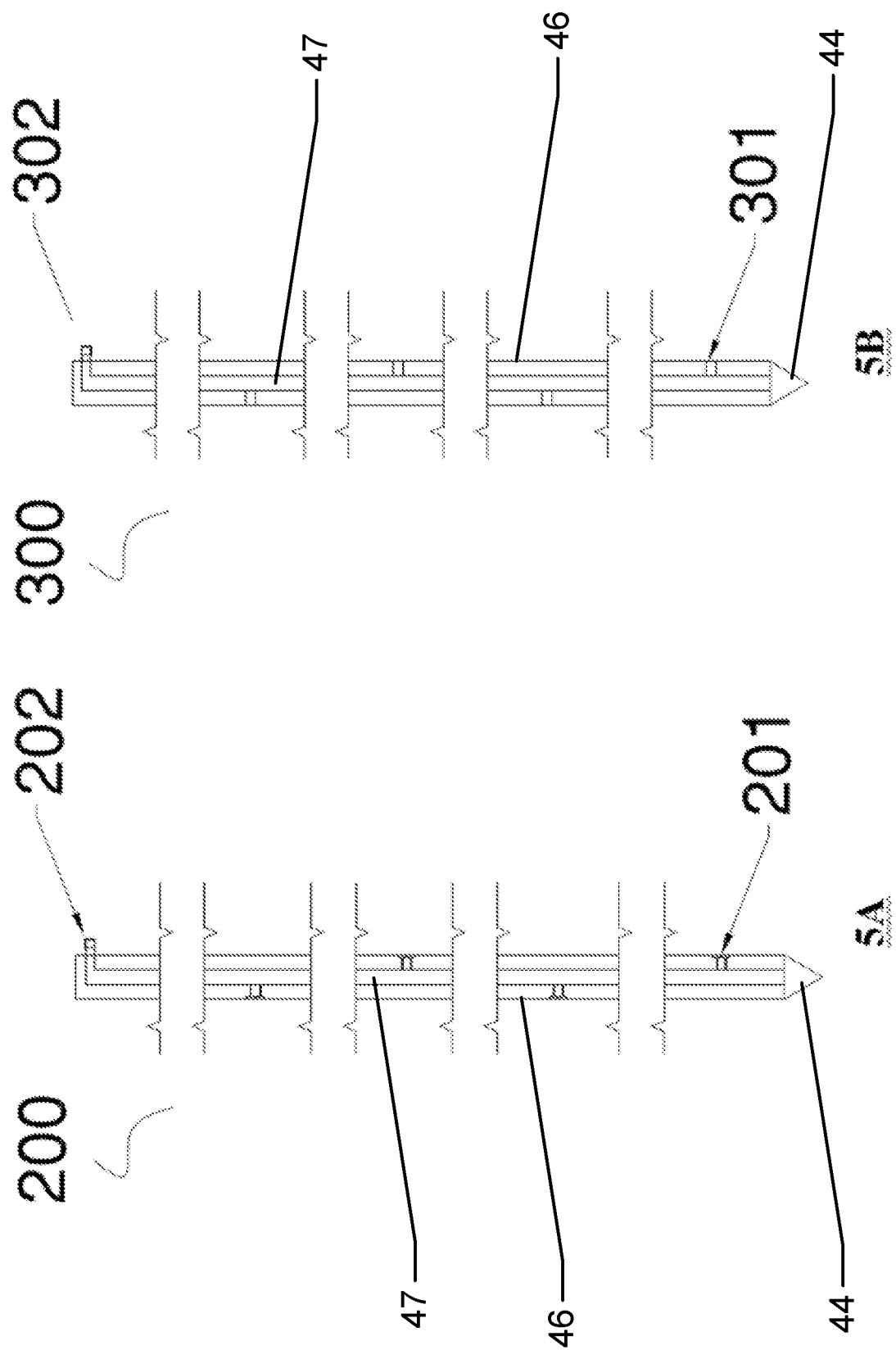
FIG. 5A and FIG. 5B (collectively, FIG. 5) are schematic illustrations of an exemplary lance designed to directly measure the temperature of the waste inside a container; and a lance designed to provide purge gas, and/or reactive materials, and/or encapsulating material to the waste inside a container.

In certain embodiments, a measuring lance, for example a lance 31 that contains one or more sensor devices 199 (e.g., thermocouples 201 in FIG. 5A) to monitor the internal temperature during heating, is inserted into the holes, pockets, burrows or breaks in the waste.

In certain embodiments, the waste can be penetrated by lances 31 at one or more entry points, which are accessed via nozzles with isolation devices built into the autoclave 60 exterior. If multiple holes are required due to the special nature of a waste, an autoclave 60 with multiple nozzles is employed.

In certain embodiments, the lances 31 can be used to inject one or more fluids (e.g., stabilizing fluid, purging gas) into the cavity of the waste container 61 and/or into the waste within the waste container 61 to perform some operation (e.g., stabilizing the waste, removing toxic gases).

In one embodiment, the lance 31 can be used to perform monitoring functions. In certain embodiments, the lance 31 comprises one or more sensor devices 199 in the form of thermocouples used to measure the temperature of the waste during the treatment process. In one embodiment, the lance 31 includes a combination of specialty lance functions and can be used to simultaneously monitor temperature and inject purge gas and/or reactive gas.

A lance 31 used to perform measuring functions comprises, or is used in conjunction with, an instrumentation and control system 150, which can be a stand-alone component or integrated with one or more other components of the system 110.

Gas/Material Feed System

The gas/material feed system 20 facilitates the introduction of reaction gas 21, nitrogen source 22, water (steam) source 23, water source 24 and nitrogen source 25 into the autoclave 60. In certain embodiments, the gas/material feed system 20 may also be used to deliver encapsulation agents to the waste in the waste container 61 inside the autoclave 60. The reaction gas 21 is used to provide the encapsulation agent.

Nitrogen source 22 is generally used to provide a purge gas to the interior of the waste container 61. Nitrogen source 22, which is optionally heated, enters the waste container 61 via the flexible hose 33 and the lance 31. The nitrogen source 22 may also be directed to the autoclave 60 through nozzle 69. Reaction gases 21 can also enter the waste container 61 or the autoclave 60 through these features. Heater 26 can be used to heat nitrogen source 22 and reaction gas 21. In certain embodiments, heater 26 is an electrical heater.

Water source 23 is typically used to provide steam to the interior of the waste container 61. Water source 23 is heated to generate steam prior to entering the waste container 61 via the flexible hose 33 and the lance 31. Steam 23 may also be directed to the autoclave 60 through nozzle 69. Heater 27 is used to heat water source 23. In certain embodiments, heater 27 is a water heater and/or a superheater.

In certain embodiments, reaction gas 21, nitrogen source 22 and water source 23 enter the waste container 61 exclusively by passage through a flexible hose 33 connected to a lance 31.

Water source 24 is generally used to provide water to cool the interior of the autoclave 60. Water source 24 enters the autoclave 60 through atomizing nozzle 70.

Nitrogen source 25 is used to atomize the water source 24. Nitrogen source 25 enters the autoclave 60 through atomizing nozzle 70. Nitrogen source 25 can also be used as a purge gas and can enter the autoclave 60 through nozzle 69.

Product Handling System

Typically, treatment of the waste in the waste storage container 61 in the autoclave 60 produces off-gas, for example water vapor, volatized organics, and/or acid gases. The off-gas produced by treatment (e.g. thermal decomposition) of the waste is fed into an off-gas treatment system 90 that is in fluid communication with the autoclave 60. The treated solids remain in the waste storage container 61, which undergoes further product handling, such as compacting on the waste storage container 61. In some embodiments, the treated solids are a dry, inert, mixture of inorganic compounds and carbon char. In some embodiments, the treated solids contain radioactive metals.

The waste storage container 61 is prepared for final disposal in a product handling system 120. The details of the product handling system will depend upon final product characteristics and disposal requirements. Exemplary product handling system include one or more of the following processes: compaction, combining smaller treated containers into larger overpacks or bundles, stabilization with concrete or the waste storage container and/or treated waste, and external decontamination of final package.

Barrier Filter

In certain embodiments, a barrier filter 8 is placed between the autoclave 60 and the off-gas treatment system 90. The barrier filter 8 can be used to further minimize the amount of radionuclides or other undesirable materials transported into the off-gas treatment system 90. The barrier filter 8 can be used to capture particulates that may be carried out of the container 61, thereby minimizing or eliminating solids from the off-gas prior to treatment in the off-gas treatment system 90. In one embodiment, purge gas is used to flush the off-gases out of the autoclave 60 and into the off-gas treatment system 90.

Off-Gas Treatment System

The off-gas treatment system 90 is used to render the off-gas safe for discharge to the atmosphere. The off-gas treatment system 90 may include any of the various known systems for such treatment. In one embodiment, the off-gas treatment system 90 comprises a thermal oxidizer and a scrubber. The thermal oxidizer converts organic constituents to water and carbon dioxide by means of, for example, a catalytic oxidizer, a ceramic matrix, or a standard combustion oxidizer. Acid gases present in the off-gas are neutralized by the introduction of caustic materials in the scrubber. Spent scrubber solution is collected and treated, e.g. by thermal decomposition. After treatment by the scrubber, the off-gas passes through one or more additional filters, then is blown to a stack for discharge. In one embodiment, the thermal oxidizer is a steam reformer. In certain embodiments, the off-gas, or the organic constituents in the off-gas, are subjected to a condensation process prior to treatment by the thermal oxidizer. In certain embodiments, the scrubber is a gas absorber.

In certain embodiments, a gas monitoring system may be employed between the barrier filter and the off-gas treatment system to analyze off-gas constituents and/or monitor gas flow rate. Examples of constituents that may be monitored are NOx, acid gases, hydrocarbons, $H_2$, CO, $CO_2$.

Instrumentation and Control System

The system 110 includes an instrumentation and control system 150, which controls one or more aspects of one or more subsystems (e.g., the waste feed system 10, the lance apparatus 30, the product handing 120, the off-gas treatment system 90) and/or one or more components (e.g., the autoclave 60) of the system 110.

The instrumentation and control system 150 is a master control system with various process inputs. The instrumentation and control system 150 is used to monitor, for example, temperatures, flows, pressures, gas compositions, radiation monitors, and/or atmospheric monitors, as measured by one or more sensor devices 199, during the waste treatment process. For example, temperatures from various parts of the apparatus may be measured by one or more sensor devices 199 (e.g., in the form of thermocouples) and monitored by the instrumentation and control system 150, including but not limited to: the walls of the autoclave 60, the heating elements, the internal space of the autoclave 60, the surface of the waste container 61, the internal space of the waste container 61, the off-gas from the autoclave 60, the nozzle 66, and ambient temperature. Flows from various parts of the apparatus may be measured by one or more sensor devices 199 in the form of flow meters and monitored by the instrumentation and control system 150, including but not limited to: flows of gas to the autoclave 60, flows of gas from the autoclave 60, outlet of the gas treatment process, and points in the off-gas treatment system. Pressures from various parts of the apparatus may be measured by one or more sensor devices 199 in the form of pressure meters and monitored by the instrumentation and control system 150, including but not limited to: pressure of the gas and materials from the gas/material feed system 20, pressure inside the autoclave 60, pressure at points in the off-gas treatment system 90, ambient pressure, and pressure before, after or across barrier filter 8. Gas composition, including for example, autoclave 60 off-gas and exhaust gas from the off-gas treatment system 90, may be measured by one or more sensor devices 199 and monitored by the instrumentation and control system 150. Instrumentation and control system 150 can monitor measurements made by one or more sensor devices 199 for the presence of NOx, volatile organic compounds (VOCs), total hydrocarbon, $O_2$, steam (water) content, $CO_2$, CO, $H_2$, halogenated species, SOx and other sulfur compounds.

In certain embodiments, the temperatures in the inner autoclave liner 63, on the surface of the waste container 61, in the off-gas from the autoclave 60, and in the waste are measured by one or more sensor devices 199 in the form of thermocouples (e.g., thermocouples 201) integrated with a lance 31, and these measurements can be monitored by the instrumentation and control system 150, to help control heating and energy release from the waste during the treatment process, determine hold points for the heating process, determine when treatment is complete, and to determine when cooldown is sufficient prior to opening the autoclave 60 and removal of the waste container 61. In some embodiments, the temperature of one or more of the sensor devices 199 in the form of thermocouple elements 201 are monitored by the instrumentation and control system 150 to protect them from overheating. In some embodiments, the flow of gas/material into the autoclave 60 and the flow of gas exiting the autoclave 60 are measured by one or more sensor devices 199 and monitored and controlled by the instrumentation and control system 150 to produce the desired outcomes of treatment, control energy release, determine hold points for the heating process, and determine when treatment is complete. In some embodiments, the pressure in the autoclave is measured by one or more sensor devices 199 and monitored by the instrumentation and control system 150 to control energy input to and release from the waste, determine when to slow or secure gas/material inputs, and determine when relief valve has actuated. In certain embodiments, gas composition is measured by one or more of the sensor devices 199 and monitored by the instrumentation and control system 150 to determine status/rate of reactions in waste in the autoclave and used by the operator to control input of energy and gas/materials.

The instrumentation and control system 150 can include one or more local controllers. A local controller controls one or more aspects of a subsystem (e.g., the waste feed system 10, the lance apparatus 30, the product handing 120, the off-gas treatment system 90) and/or a component (e.g., the autoclave 60) of the system 110. When there are multiple local controllers in the instrumentation and control system 150, these local controllers can be in communication with each other.

The instrumentation and control system 150 can include a storage repository. In such a case, the storage repository can store data (e.g., measurements made by sensor devices 199). The instrumentation and control system 150 can use this stored data, for example, to develop and run models, develop trends and threshold values, and assist in the evaluation of currently-obtained measurements.

Sensor Devices

The system 110, including some of its components (e.g., the autoclave 60) and one or more of the subsystems (e.g., the lance apparatus 20, the product handing 120, the off-gas treatment system 90) rely on measurements of one or more parameters (e.g., temperature, pressure, time, presence of a gas, gas flow) in order for the methods (or portions thereof) described herein to function properly. The one or more sensor devices 199 are configured to measure these parameters. The sensor devices 199 can be communicably coupled to instrumentation and control system 150 so that the instrumentation and control system 150 can perform certain actions based on a measurement of a parameter made by a sensor device 199 at a given point in time.

Referring now to FIG. 1, an exemplary apparatus includes a waste feed system 10, an enclosure 1, an autoclave 60, a lance apparatus 30, a gas/material feed system 20, a product handling system 120, a barrier filter 8, an off-gas treatment system 90, an instrumentation and control system 150, one or more sensor devices 199, and a waste storage container 61. In one embodiment, the waste feed system 10 can distribute the waste storage container 61 (also sometimes more simply called a waste container 61 herein) to the enclosure 1, for example through an airlock 11, for placement in the autoclave 60. The design of the enclosure 1 is dependent on the expected concentration and type of waste, for example, radioactive material, in the waste container 61. A crane 12 or other lifting device can be used to move the waste container 61 within the enclosure 1 and into the autoclave 60. The lance apparatus 30 comprising one or more lances 31 is also housed within the enclosure 1 for use with the autoclave 60 for the processing of waste disposed within the waste container 61.

Figure 7A:
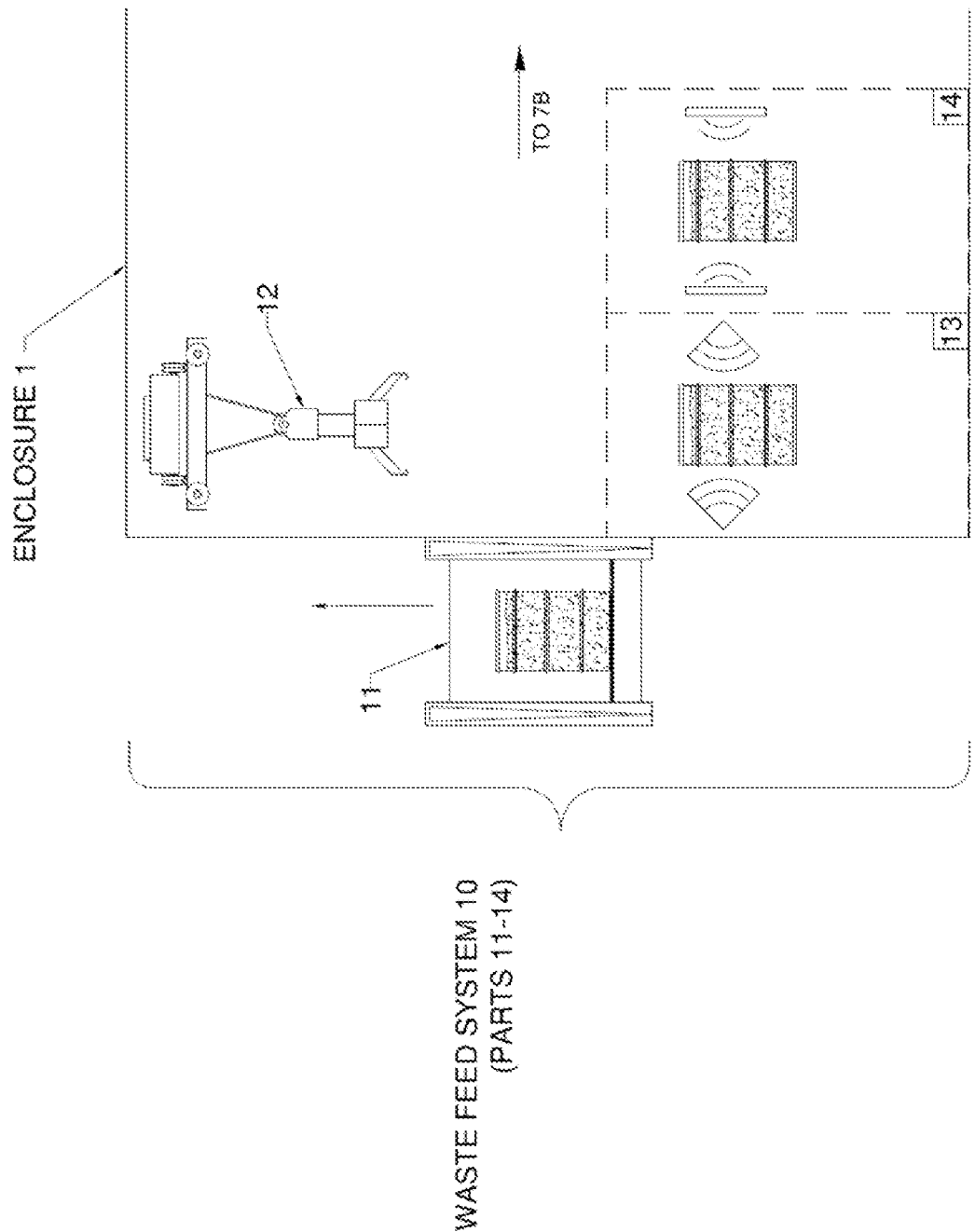
FIG. 7A, FIG. 7B, FIG. 7C, and FIG. 7D (collectively, FIG. 7) are a schematic illustration of an exemplary system for in-container thermal decomposition using lances for processing containerized waste, constructed in accordance with an exemplary embodiment of the present invention.
Figure 7B:
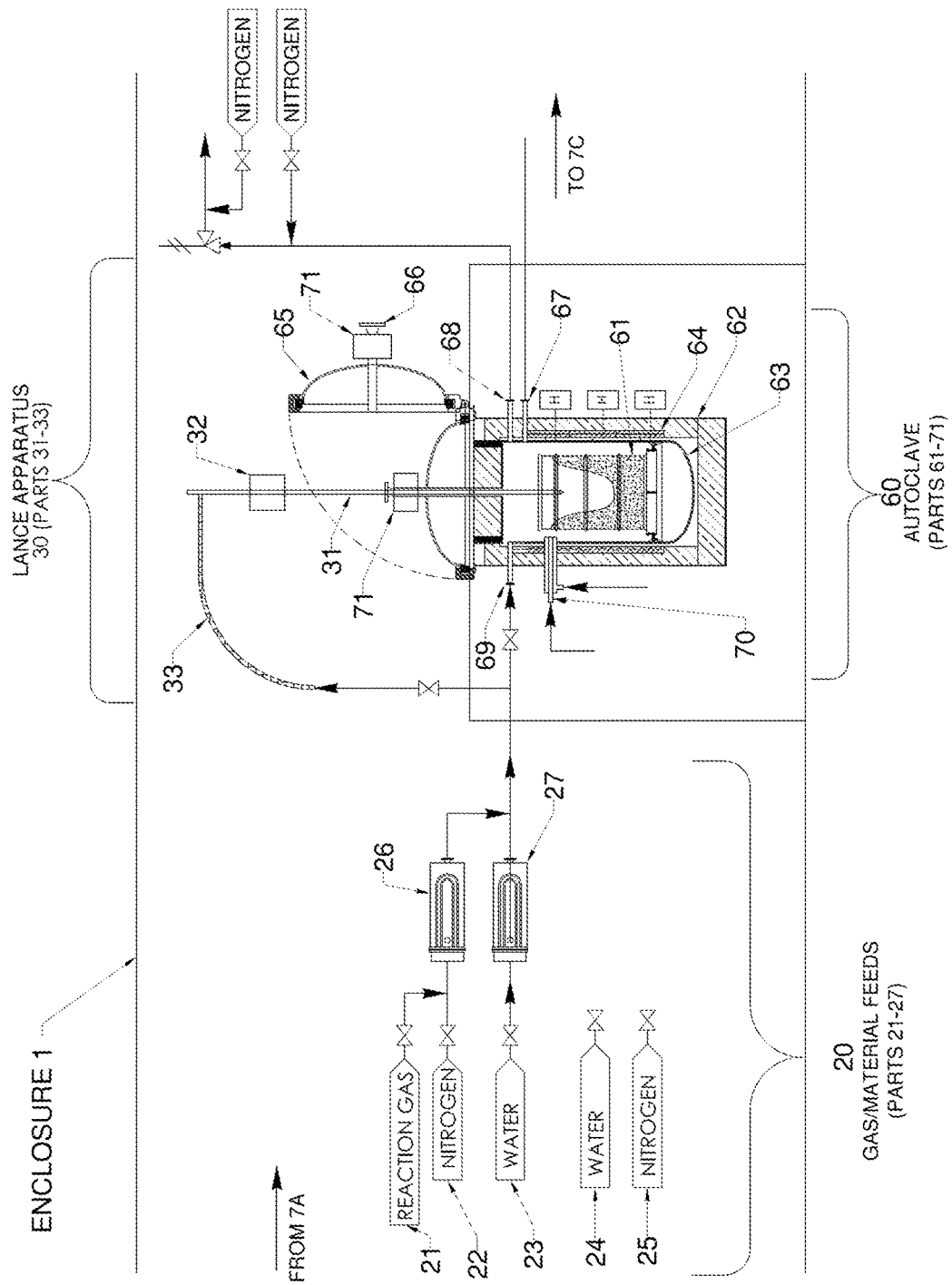
Figure 7C:
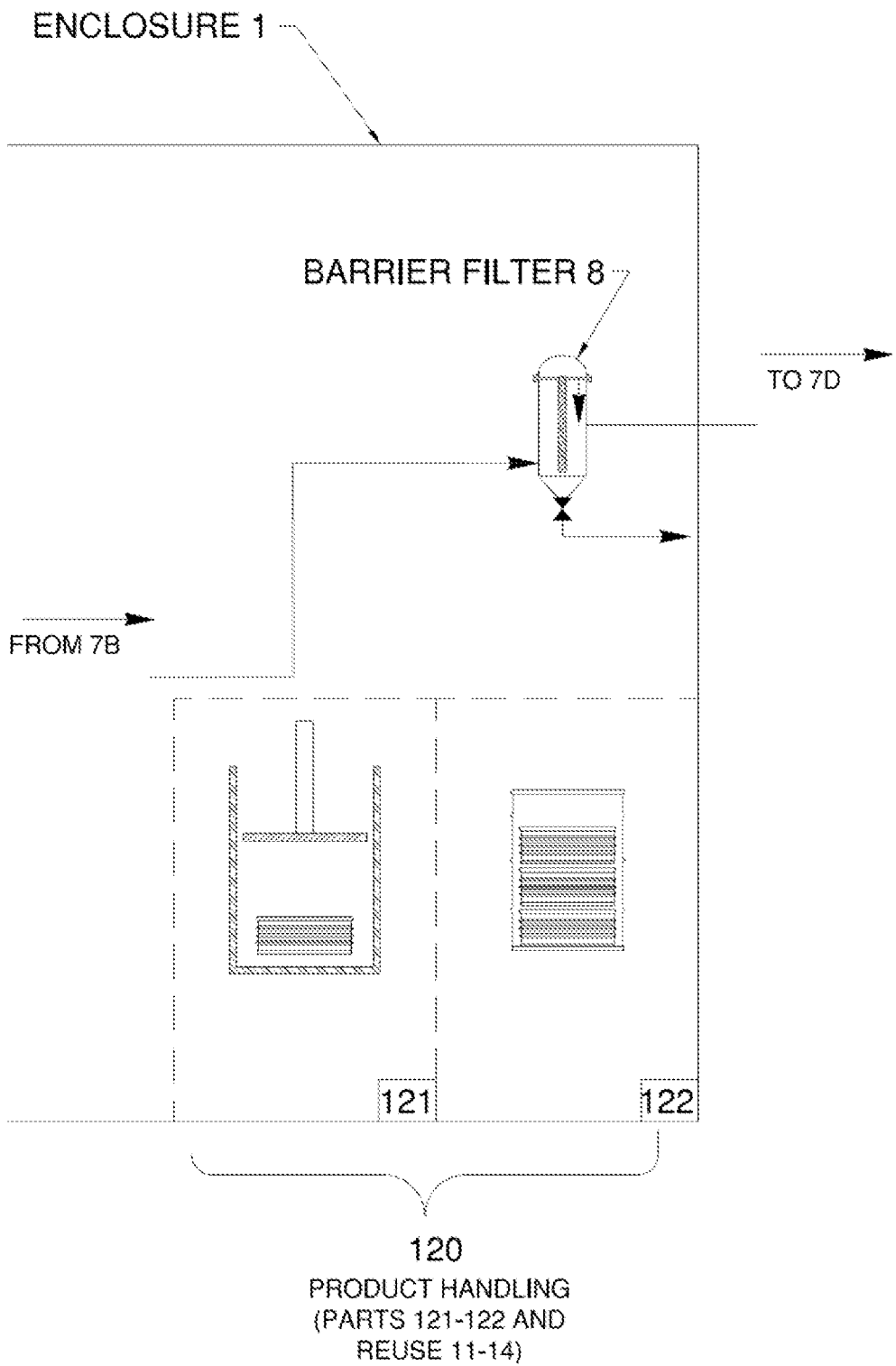
Figure 7D:
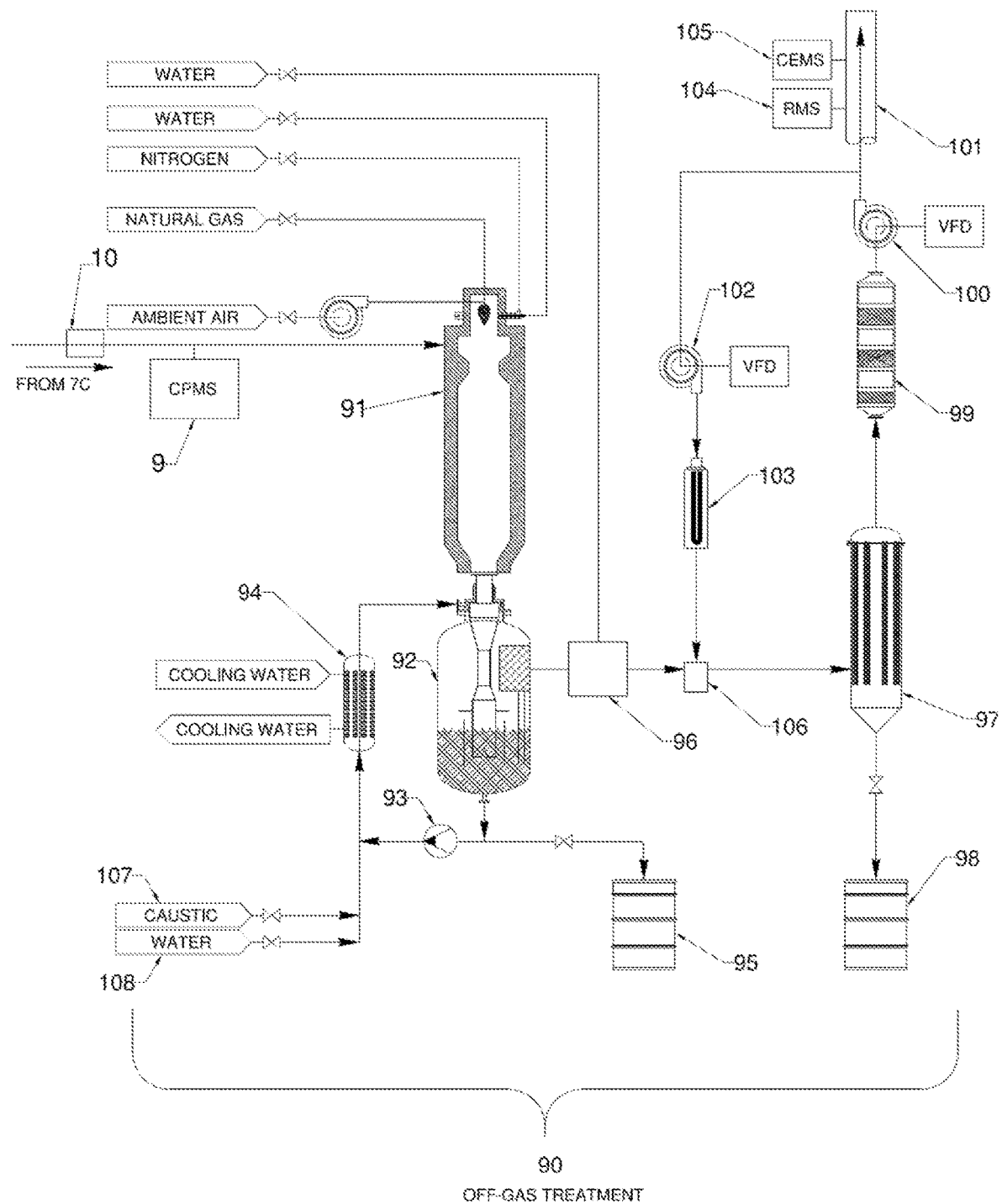

The enclosure 1 may also house non-destructive assay 14 and/or real-time radiography equipment 13 (see FIG. 7A). Such equipment may also be external to the enclosure 1 or used previously to partially characterize the waste. Exemplary non-destructive assays 14 can include but, are not limited to, gamma-ray spectrometers and neutron counters.

The autoclave 60 is a strong, durable, heated container for carrying out chemical reactions and other processes using high pressures and/or high temperatures. In one embodiment, the autoclave 60 includes an inner sleeve 63 within an outer shell 62 which is heated by an indirect heat source using conductive or radiative heat transfer elements, such as electrical heaters 64 that are external to the inner sleeve 63. The autoclave 60 includes an autoclave lid 65 which can be remotely operated to open or to seal the autoclave 60. Examples of an autoclave 60 are shown below with respect to FIGS. 2A through 2C. The autoclave 60 can be used to thermally decompose waste in the waste container 61, as described in more detail below. The operation of the autoclave 60 (or portions thereof, such as the heaters) can be controlled by the instrumentation and control system 150.

The lance apparatus 30 is intended for insertion of lances (e.g. lances 31) into a sealed autoclave containing a waste container 61 that contains waste. The lance apparatus 30 is used to insert various lances into the autoclave 60 through a nozzle and seal designed to prevent interchange of gas and particulates between interior and exterior of the autoclave 60. The operation of the lance apparatus 30 (or portions thereof) can be controlled by the instrumentation and control system 150.

The lance apparatus 30 includes one or more lances 31 that are each typically implemented as a shaft 46 with a tip 44 on one end designed for a specific function. In some cases, the shaft 46 can have one or more channels 47 disposed therein, where each channel 47 is used to perform a function specific to each lance 31. A channel 47 can also be accompanied by additional features (e.g., port 401, port 403) in the shaft 46 to perform its function. One lance 31 is implemented at a time, with each lance 31 having a specific function or multiple functions. For example, lance 31 can be a specialty lance designed for the piercing purpose, or a multi-function purpose that includes the piercing function, among other functions. For example, the lance 31 can be used to pierce the waste container 61, penetrate the waste, perform measuring functions, or provide a flow path for purge gases and reactive materials directly to the waste inside the waste container 61. In one embodiment, a lance 31 includes a combination of specialty lance functions (e.g. sensor devices 199) and can be used to simultaneously measure temperature (as monitored by the instrumentation and control system 150) and inject purge gas and or reactive gas. In another embodiment, the lance 31 includes a material injection function and can be used to inject encapsulating material for encapsulating or binding the waste after treatment.

Exemplary lances 31 perform various necessary functions to ensure complete and safe treatment of the waste in the waste containers 61. The exemplary lances 31 can vary in design as needed to perform a one or a combination of tasks, including any of the following:

Pierce the waste container 61. Heating the waste container 61 releases gases that will pressurize the waste container 61 if they are not vented. While small waste containers (e.g., sealed plastic bags, aerosol cans, paint cans, five gallon buckets, plastic bottles) inside the main waste container 61 are expected to have sides or seals that melt, thus allowing escape of gas, or may be allowed to deform and burst during the process, it is necessary that the large waste container 61 containing the waste be pierced to allow escape of thermal decomposition gases. A specialty lance 31 with the appropriately shaped tip 44 is inserted through the nozzle 66 to pierce the waste container 61. If multiple holes are required due to the special nature of a waste, an autoclave 60 with multiple nozzles 66 in the autoclave lid 65 is employed.

Penetrate the waste inside the waste container 61. It is desirable to create a hole in the waste to allow insertion of a lance 31 which provides purge gas, provides reactants, and/or contains one or more sensor devices 199 to measure the internal temperature during heating. Additionally, there are waste containers 61 that contain waste that has been mixed with/encapsulated in cement. A specialty lance 31 is used to penetrate/fracture the waste to allow egress of thermal decomposition gases and insertion of the purge/measuring lance. If multiple entry points are required due to the special nature of a waste, an autoclave 60 with multiple nozzles 66 in the autoclave lid 65 is employed.

Purge gas from the waste container 61. A purge of inert gas is provided to sweep thermal decomposition gas from the waste container 61. The flow is low to prevent the entrainment of solids in the gas escaping the waste container 61. Multiple exit ports can be installed along the length of the lance 31.

Insert reactive materials into the waste. Reactive materials, for example steam, are injected through the lance 31. Multiple exit ports can be installed along the length of the lance 31 to distribute flow.

Measure temperature. A lance 31 with appropriate temperature measurement sensor devices 199 (e.g. thermocouples) is useful in determining the temperature distribution inside the waste container 61. Such information allows for the instrument and control system 150 to provide finer control of the heat up of the waste, which in turn provides finer control of the release of thermal decomposition gas and also provides clear indication on when the internal temperature has reached the desired hold temperature for treatment.

Inject encapsulating material. It may be desirable to encapsulate the ash remaining in the waste container 61 at the end of treatment. Encapsulating material can be injected into the waste container 61 through a lance 31. Multiple ports in the lance 31 can be used to provide appropriate distribution of encapsulating material. A low-speed mixer can be inserted through a separate nozzle 66 in the autoclave lid 65 if desirable—the mixer is another specialty lance 31.

The waste feed system 10 can feed waste to the autoclave 60, which may be housed in an enclosure 1, as described above. In certain embodiments, the waste feed system 10 feeds the waste in waste containers 61 to avoid bulk handling, opening and sorting, for example when the waste contains alpha-particle-emitting radionuclides, highly radioactive waste and other hazardous material. A waste container 61 is inserted into the autoclave 60 and, in turn, the autoclave 60 is sealed. The operation of the waste feed system 10 can be controlled by the instrumentation and control system 150.

The gas/material feed system 20 facilitates the introduction of reaction gases, purge gas, steam, cooling water spray and/or encapsulation agents into the autoclave 60 and/or the waste container 61. Some of the components of the gas/material feed system 20 enters the autoclave 60 through a nozzle on the side of the autoclave 60 (e.g. nozzle 69, shown in FIG. 7B) or by passage through a flexible hose 33 connected to a lance 31 (shown in FIG. 7B). The gas/material feed system 20 includes heaters for certain gases and materials. The operation of the gas/material feed system 20 can be controlled by the instrumentation and control system 150.

An exemplary lance 31 configured for a piercing function can be inserted into the autoclave 60 and pierces the waste container 61, and if appropriate (dependent on the nature and containment of the waste and the lance-type), can penetrate the waste inside the waste container 61. The autoclave 60 is heated in a controlled fashion to the desired temperature, for example a temperature in the range of about 200° C. to about 800° C., or a temperature wherein the liquids and organics in the waste will evaporate and volatize. To measure the progress of the thermal decomposition of the waste, the lance 31, typically an exemplary lance 31 configured with one or more sensor devices 199, for example temperature sensors, is inserted into the waste container 61. The temperatures measured by these sensor devices 199 can be monitored by the instrumentation and control system 150. To aid in the transport of gas from the waste container 61, and to ensure a substantially inert environment, the lance 31, typically an exemplary lance 31 intended for a gas distribution purpose, for supplying low-flow, inert purge gas, typically nitrogen, is inserted into the waste container 61. The flow rate can be controlled by the instrumentation and control system 150 to ensure waste and/or thermally decomposed waste solids are not transported from the waste container 61.

An application of heat to the waste container 61 in the sealed autoclave 60, typically achieved by indirect heating of the autoclave 60, results in water evaporating, organics being volatized and thermally decomposed, and corrosives and reactive materials being converted into non-hazardous oxides or carbonate compounds. The addition of reactive gases, injected through lances 31, is made at appropriate conditions to complete conversion reactions. The injection of steam into the waste container 61 following thermal decomposition results in further conversion of residual carbon char into carbon monoxide and carbon dioxide along with the release of some hydrogen. The injection of other reactive gases is used to ensure conversion of corrosive and reactive materials. The residue in the waste containers 61 is an inert non-reactive, non-volatile low-carbon ash containing radioactive metals. Non-combustible items contained in the waste container 61, such as glass, metal, and construction debris (typically brick, stone, and concrete rubble) remain in the waste container 61. If desired, encapsulating material can be added to the waste container 61 to physically stabilize residue. All of these aspects of the waste treatment and handling can be controlled by the instrumentation and control system 150.

The treated or thermally decomposed waste in the waste container 61 is a substantially dry, inert, inorganic matrix which may include small amounts of carbon char containing radioactive metals and products of reactions with reactive materials. In certain embodiments, reactive materials including gases, liquids or solids or combinations thereof, can be introduced through a lance to promote reactions to decomposition and reduce reactivity of the treated waste. For example, reactive materials may include, but are not limited to: steam, carbon dioxide, air, oxygen and the like. Diluting of reactive materials with inert gas is contemplated. In certain embodiments, the waste is treated with a reactive material to reduce the amount of carbon char in the treated waste product.

In-container (e.g. waste container 61) treatment utilizes thermal decomposition to treat containerized hazardous, radioactive and/or mixed wastes by means of in-container thermal treatment to breach sealed waste containers 61 and remove the free liquids, organic materials, and reactive materials from the waste containers 61. At thermal decomposition temperatures, all liquids and organics in the waste container 61 evaporate and volatize. In certain embodiments, the off-gas produced by the autoclave 60 typically comprises water vapor, volatized organics, and acid gases from the thermal decomposition of various plastics and organics present in the waste container 61. The off-gas produced by thermal decomposition is collected and fed into an off-gas treatment system 90 that is in fluid communication with the autoclave 60. Any radionuclides present in the containerized waste are retained in the original container because radioactive metals will not volatize at autoclave temperatures, and the autoclave injection flows and off gas flow are kept at a rate that will avoid the carryover of the radionuclides.

In certain embodiments, the barrier filter 8 is placed between the autoclave 60 and the off-gas treatment system 90. The barrier filter 8 can be used to further minimize the amount of radionuclides transported into the off-gas treatment system 90. The barrier filter 8 can be used to capture the small amount of particulates that may be carried out of the waste container 61, producing a nearly solid free gas for treatment in the off-gas treatment system 90. The operation of the barrier filter 8 (or portions thereof) can be controlled by the instrumentation and control system 150. Low flow purge gas is used to sweep the off-gases out of the autoclave 60 and to the off-gas treatment system 90 that is in fluid communication with the autoclave 60.

The off-gas treatment system 90 is used to treat off-gas vapor streams so that the contents of the off-gas vapor streams are safe to discharge to the atmosphere. A gas monitoring system may be employed downstream of the barrier filter to determine gas constituents. Information from such a system can be used for control of the autoclave 60. Examples of items that may be monitored are NOx, acid gases, Total Hydrocarbons, Hydrogen, CO, $CO_2$. It is also desirable to monitor gas flow rate. These monitoring functions can be performed by a combination or one or more sensor devices 199 and the instrumentation and control system 150.

The off-gas treatment system 90 may include any of the various known systems for such treatment. In the embodiment considered, the off-gas treatment system 90 comprises a thermal oxidizer and a downstream quencher scrubber. After leaving the autoclave, the off-gas stream enters the thermal oxidizer, which is operated under oxidizing conditions for the conversion of organic vapors to water and carbon dioxide. The thermal oxidizer may include a catalytic oxidizer, a ceramic matrix, or a standard combustion oxidizer. Acid gases present in the off-gas stream are neutralized by the introduction of caustic materials in the downstream scrubber. Spent scrubber solution is collected and returned to the thermal decomposition process. Gas leaving the scrubber enters an off-gas filter, then passes through a HEPA filter to a blower and is directed to a stack for discharge. The use of other thermal oxidizing devices, for example a steam reformer, is contemplated. The use of a condenser prior to the thermal oxidizer to condense the bulk of the organics is contemplated. The liquids are then sent to be further treated in one thermal oxidizer while the non-condensable gases are sent to the same or a separate thermal oxidizer. The use of other types of scrubbers and gas absorbers is contemplated. Any of the myriad standard off-gas treatment systems may be used as appropriate for the off-gas stream particular to the waste being treated. The operation of the off-gas treatment system 90 (or portions thereof) can be controlled by the instrumentation and control system 150.

Periodic surveys in the off-gas treatment system 90 and analysis of spent scrubber liquid and filter solids are used to confirm the limited carryover of radioactive material. Discharge lines and the barrier filter are heated as needed to reduce the deposition of tars and waxes. These functions can be controlled by the instrumentation and control system 150.

The resulting waste in the waste container 61 is a dry, inert, inorganic matrix with limited carbon char containing radioactive metals. The waste container 61 is prepared for final disposal in a product handling system 120. The details of the product handling system 120 will depend upon final product characteristics and disposal requirements. Typical product handling involves compaction, and/or combining smaller treated packages into larger overpacks, and/or stabilization with concrete. External decontamination of final packages is usually a part of product handling.

The treatment of the waste is monitored and adjusted by the instrumentation and control system 150. The instrumentation and control system 150 is used to monitor, for example, temperatures, flows, pressures, gas compositions, radiation monitors, and/or atmospheric monitors, as measured by one or more sensor devices 199, during the waste treatment process.

In certain embodiments, the systems, apparatus and methods described herein are useful for the conversion of reactive metals and compounds into stable compounds that can be disposed. Such compounds, include, but are not limited to, sodium, potassium, calcium, magnesium, uranium, cyanide, and other reactive compounds that can burn, ignite, or explode when exposed to certain other materials or when exposed to varied environmental conditions. In certain embodiments, the reactive metals present in the containerized wastes, such as those in transuranic or fuel debris waste, are fine powders that are strongly reducing when heated above 500° C. The strongly reducing metals will bond or react with oxygen, steam, carbon oxides, chlorine, or fluorine in the solid inorganic waste near the reactive metals or with the reactive materials introduced through the lance. Control of such reactions is enhanced by the ability to measure waste temperature using the lance. Examples of stable compounds produced include NaCl, $Na_2CO_3$, $Na_2SO_3$, KCl, $K_2CO_3$, $K_2SO_3$, CaO, $CaCO_3$, $CaCl_2$), $CaSO_3$, $U_2O_3$, $U_3O_8$, MgO, $MgCl_2$, $MgCO_3$, and $MgSO_3$. In one embodiment, metallic uranium fuel pieces are substantially converted into inert, non-reactive uranium oxide metal. Cyanides, if present, will volatize from the containerized wastes and will oxidize in the steam reformer to water, carbon dioxide, and nitrogen.

In certain embodiments, the apparatus and methods described herein are useful for the conversion of nitrogen-containing wastes into stable compounds that can be disposed. Exemplary nitrogen-containing wastes include, but are not limited to, NOx compounds, liquid nitrogen-containing compound with flash points of less than 60° C., and aqueous liquids with a pH of less than 2 or greater than 12.5. Examples of stable compounds produced include NaCl, $Na_2CO_3$, $Na_2SO_3$, KCl, $K_2CO_3$, $K_2SO_3$, CaO, $CaCO_3$, $CaCl_2$), $CaSO_3$, MgO, $MgCl_2$, $MgCO_3$, and $MgSO_3$.

As discussed above, the system 110 includes an instrumentation and control system 150, which controls one or more aspects of one or more subsystems (e.g., the waste feed system 10, the lance apparatus 30, the product handing 120, the off-gas treatment system 90) and/or one or more components (e.g., the autoclave 60) of the system 110. In some cases, the instrumentation and control system 150 can include multiple controllers. In such a case, the local controllers can be in communication with each other.

The instrumentation and control system 150 can include one or more of a number of components. Such components can include, but are not limited to, a hardware processor, memory, a control engine, a communication module, a security module, a storage repository, a transceiver, an application interface, a power module, and a timer. At least some of the controls implemented by the instrumentation and control system 150 can be based on one or more measurements of one or more parameters made by one or more of the sensor devices 199.

Each of the one or more sensor devices 199 can include any type of sensing device that measures one or more parameters. Examples of types of sensor devices 199 can include, but are not limited to, a passive infrared sensor, a photocell, a pressure sensor, an air flow monitor, a gas detector, a voltmeter, an ammeter, and a resistance temperature detector. Examples of a parameter that is measured by a sensor device 199 can include, but are not limited to, a temperature, a level of gas, a rate of flow of a fluid, a level of humidity, voltage, current, resistance, content of a gas, and a pressure.

In some cases, the parameter or parameters measured by a sensor device 199 is communicated to the instrumentation and control system 150. In such a case, the instrumentation and control system 150 can operate one or more of the devices (e.g., the heaters of the autoclave 60) and/or one or more of the subsystems (e.g., the waste feed system 10, the gas/material feed system 20, the lance apparatus 30, the product handing 120, the off-gas treatment system 90) of the system 110.

Figure 2A:
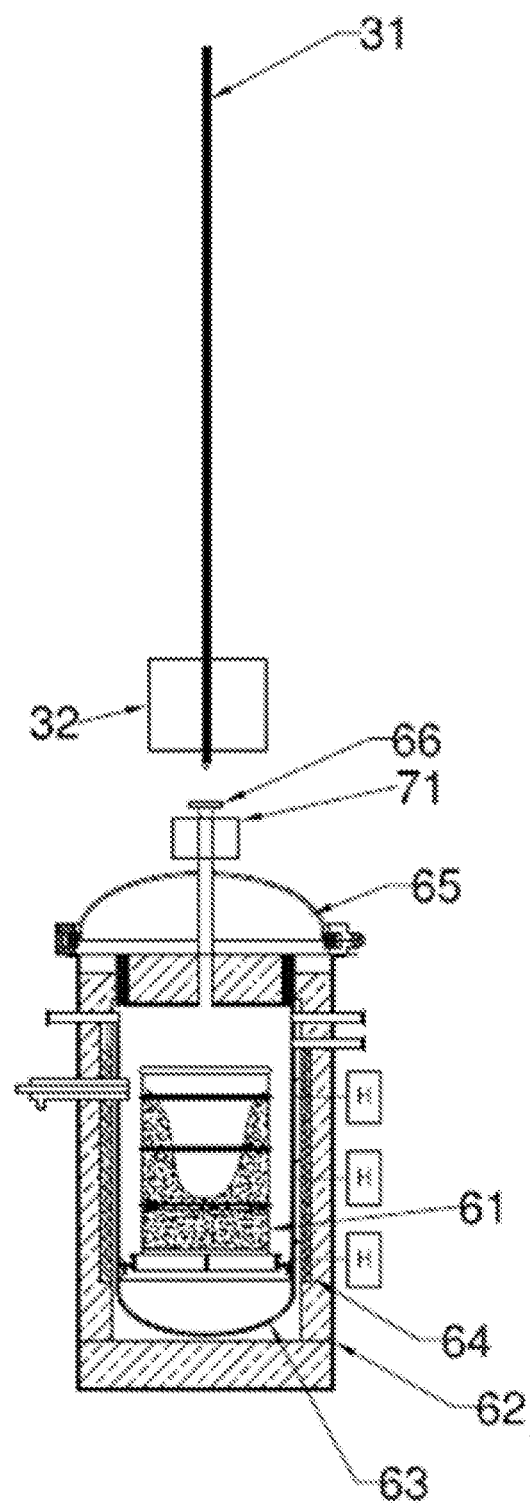
FIG. 2A, FIG. 2B and FIG. 2C (collectively, FIG. 2) are schematic illustrations of an exemplary piercing and/or penetrating lance. The lance is shown withdrawn, inserted after piercing the container, and inserted after penetrating waste in the container. The waste container is depicted inside an exemplary autoclave used for thermal decomposition of waste in the container.
Figure 2B:
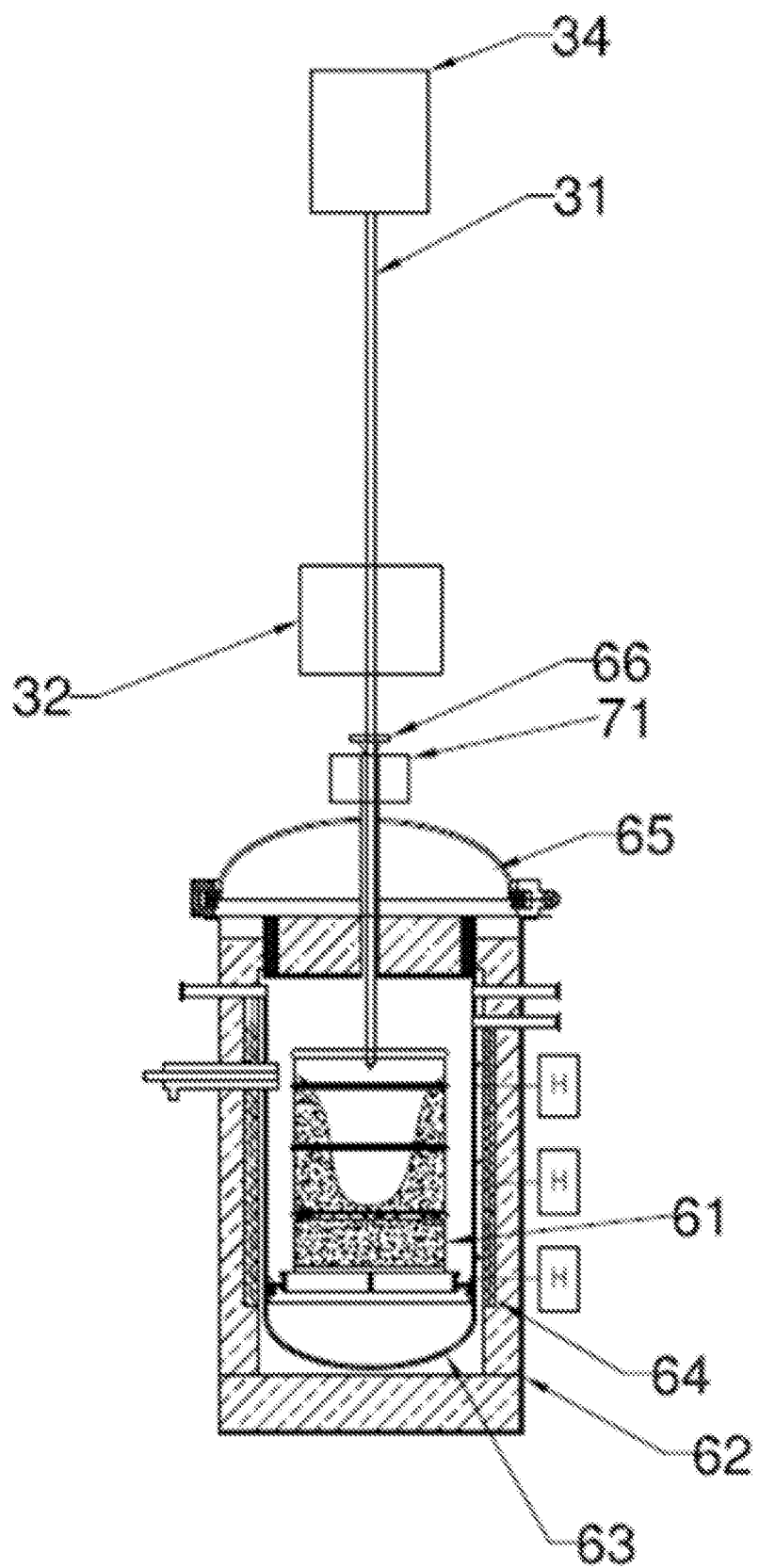
Figure 2C:
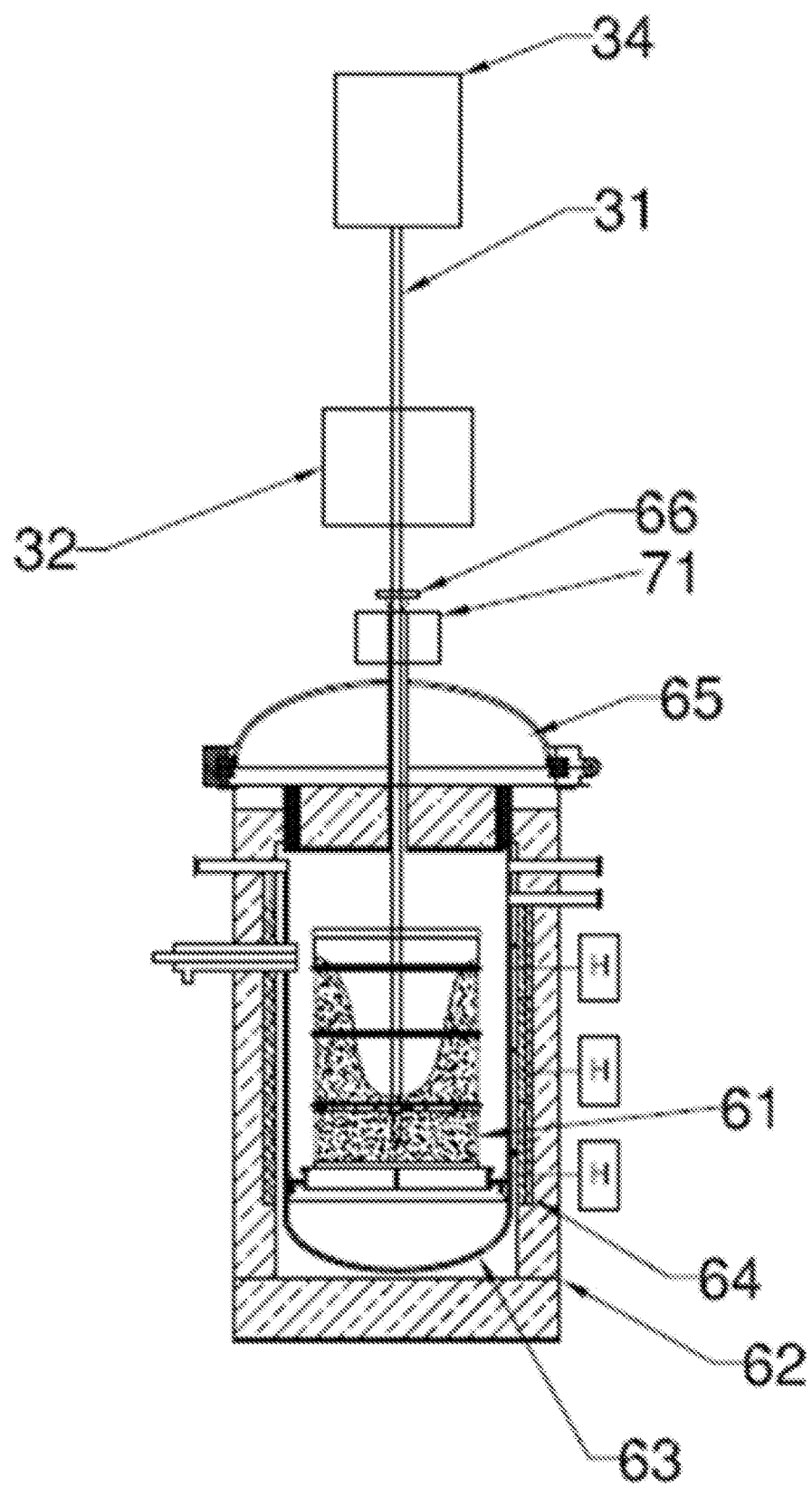

Referring to FIG. 2, there is shown an exemplary lance 31 which includes certain piercing or penetrating embodiments. Three views are shown; FIG. 2A is the lance 31 fully withdrawn, FIG. 2B is the lance 31 after having just pierced the waste container 61, FIG. 2C is the lance 31 after penetrating the waste in a waste container 61. Each view is of an autoclave 60 with the waste container 61 placed inside. The autoclave comprises an autoclave exterior 62, an autoclave vessel 63 and autoclave heaters 64. Also shown are an autoclave lid 65 with a nozzle 66 installed for insertion of the lance 31. Nozzle 66 is a pipe which is connected to autoclave 60 at one end and, in certain embodiments, includes a flange at the other end. A lance seal 71 is installed in the nozzle 66. The purpose of lance seal 71 is to minimize leakage of the atmosphere inside the autoclave to the outside of the autoclave 60 while the lance 31 is inserted into the autoclave 60 through nozzle 66. Any suitable nozzle or seal may be used. Lance seal 71 includes one or more airlocks, valves, and/or seal mechanisms which serve the purpose of preventing leakage of the atmosphere from inside the autoclave through the nozzle during the insertion of lance 31. In certain embodiments, the lance seal 71 is an airlock and a gas seal. For example, the lance seal 71 can comprise two full-port ball valves with a labyrinth seal in between. The inside diameter of the labyrinth seal matches the outside diameter of the lance or lances. The labyrinth seal is supplied with a suitable gas (e.g., nitrogen) purge to maintain the seal when the lance 31 is in place.

Figure 3:
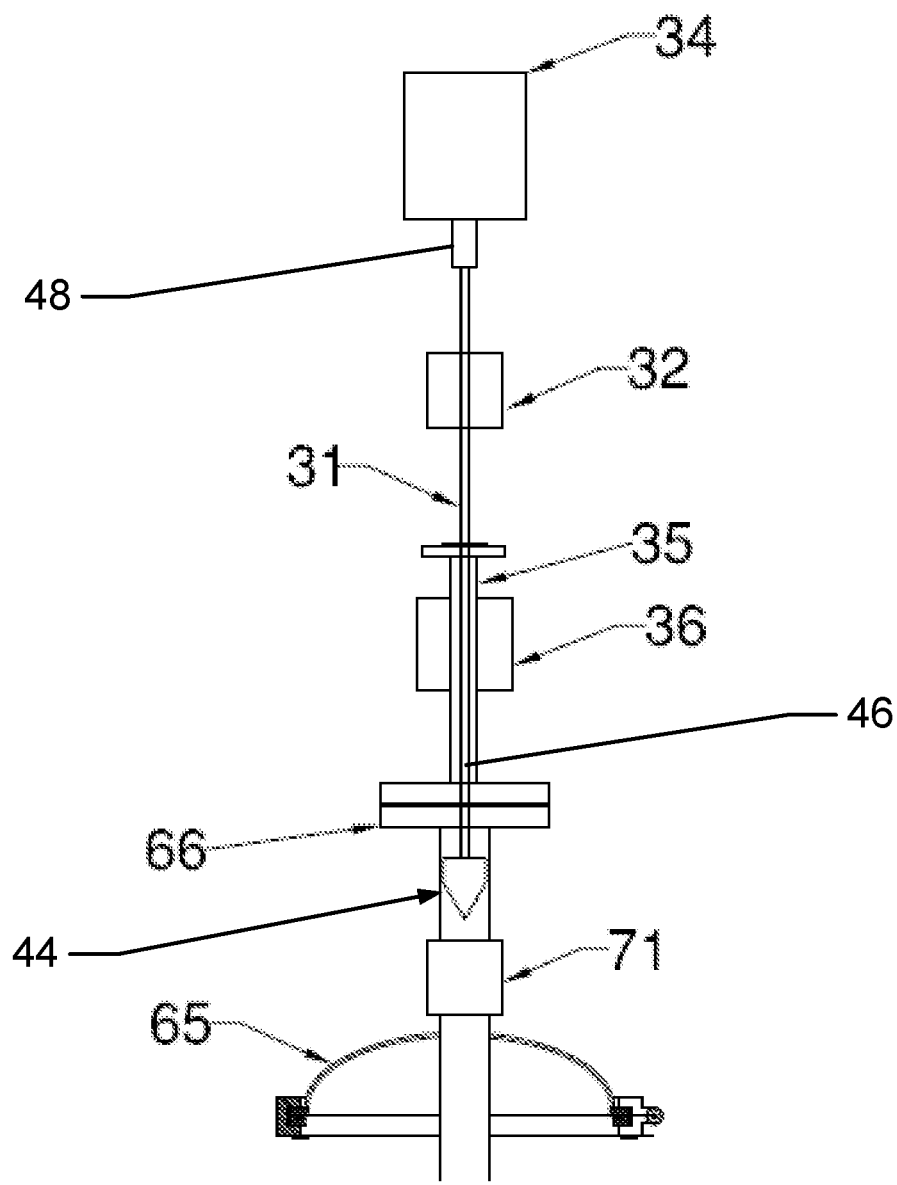
FIG. 3 is a schematic illustration of an exemplary piercing and/or penetrating lance which comprises a piercing/penetrating tip that is larger than the diameter of the lance. The lance is shown inserted through seal, spool piece and nozzle, and is positioned to enter the autoclave lid through isolation device.

In certain embodiments, the piercing/penetrating tip 44 of a lance 31 may be larger in diameter than the shaft 46 of the lance 31 to allow the hole in the waste container 61 to be larger than the shaft 46 of the lance 31 (see FIG. 3). In such an embodiment, the lance seal 36 and spool piece 35 are built into the lance 31. A separate spool piece 35 with a lance seal 36 may be used for inserting other lances.

In one embodiment, the lance 31 comprises a solid shaft 46 (e.g., has no channels 47) with an appropriately designed tip 44 for the function of piercing the waste container 61 and/or penetrating the waste disposed within waste container 61. Some waste steams may require only a single lance 31 to perform the functions of piercing the waste container 61 and penetrating the waste. In certain embodiments, several lances 31 can be used to achieve penetration of dense or hard wastes, for example waste solidified in a binder such as grout.

The lance 31 is moved up and down by a lance drive 32. Lance drive 32 is a mechanism that controls the movement of the lance 31 into and out of the autoclave 60. In one embodiment, the lance drive 32 is a set of spring-loaded wheels. The wheels center the lance 31 and have friction surfaces and a spring-load pressure adequate to hold and drive the lance 31 when not piercing or penetrating. For piercing and penetrating, once the lance 31 is in position on the waste container 61 or in contact with the waste, the drive pressure is minimized and a lance penetrating mechanism 34 is placed in contact with the top end of the lance 31 to drive it through the lid of the waste container 61 or into the waste. The lance piercing or penetrating mechanism 34 provides the force necessary to pierce the waste container 61 (and/or penetrate the waste inside the waste container 61) with the lance 31. In certain embodiments, the lance penetrating mechanism 34 uses a reciprocating action, similar to that of a pile driver. In one certain embodiment, the lance penetrating mechanism 34 comprises a hydraulic ram. In one embodiment, the end of the lance 31 that is connected to the lance penetrating mechanism 34 is reinforced and/or enlarged using a reinforcement mechanism 48. Examples of a reinforcement mechanism can include, but are not limited to, a thickening of the shaft 46, an additional structure that is sleeved over and secured to the shaft 46, and a different material used in the shaft 46.

Each lance 31 is installed through lance drive 32 and into lance nozzle 66. In certain embodiments, the movement of the lance 31 is by a robotic arm (not shown). In certain embodiments, the lance seal mechanism purge is confirmed to be activated before opening the top airlock valve. In certain embodiments, the pressure in the autoclave 60 is checked for an indication that the bottom airlock valve is sealed before inserting lance 31 through the labyrinth seal 71. The lower full-port valve of the airlock is then opened, the pressure in the autoclave 60 is checked for indication that the seal mechanism is holding pressure, and then the lance 31 is driven into the waste container 61. The lance piercing/penetrating mechanism 34 is moved into place and piercing of the waste container 61 commences. In certain embodiments, autoclave pressure, temperature and process off-gas can be measured by one or more sensor devices 199, and those measurements can be sent to the instrumentation and control system 150 to determine response to piercing the waste container 61 and/or penetrating the waste. After piercing the container 61, penetration of the waste occurs. If a separate lance 31 is to be used for penetrating the waste, the piercing lance 31 is withdrawn using a procedure that is the reverse of its installation. The penetrating lance 31 is then brought into position just inside the container 61 with the lance piercing and penetrating mechanism 34 in place using a procedure analogous to the one used to place the piercing lance 31. The lance piercing/penetrating mechanism 34 is energized to penetrate the waste. If a lance 31 that combines the functionality of penetrating the waste container 61, measuring temperature, and injecting gas flow is used, then the lance 31 is left in place for waste container 61 thermal treatment. Otherwise, the penetrating lance 31 is withdrawn in preparation of installation of the next lance 31.

Referring to FIG. 3, there is shown an exemplary piercing and/or penetrating lance 31 which comprises a piercing tip 44 that is larger than the diameter of the shaft 46 of the lance 31. The lance 31 is shown inserted through, spool piece 35, lance seal 36, and nozzle 66, and is positioned to enter the autoclave lid 65 through isolation device 71. Spool piece 35 provides the physical mount for the lance seal 36. In this embodiment, 71 an isolation device, which prevents the transmission or release of the autoclave 60 atmosphere while placing nozzle spool 35 and lance seal 36 in position. In certain embodiments, exemplary isolation device 71 includes but is not limited to one or two valves, such as full port ball valves. In certain embodiments, the isolation device comprises a labyrinth seal. In certain embodiments, the isolation device does not comprise a labyrinth seal. The piercing lance tip 44 is larger in diameter than the shaft 46 of the lance 31 to allow the hole in the drum to be larger than the shaft 46 of the lance 31. In such an embodiment, the lance seal 36 is part of a spool piece 35 that is built into the lance 31 and nozzle 66 has an isolation device 71. A separate spool piece 35 with a lance seal 36 is used for inserting other lances with tips 44 that are the same size or smaller than the diameter of the shaft 46 of the lance 31. In this case the spool piece 35 and lance seal 36 are separate from the lance 31.

Figure 4:
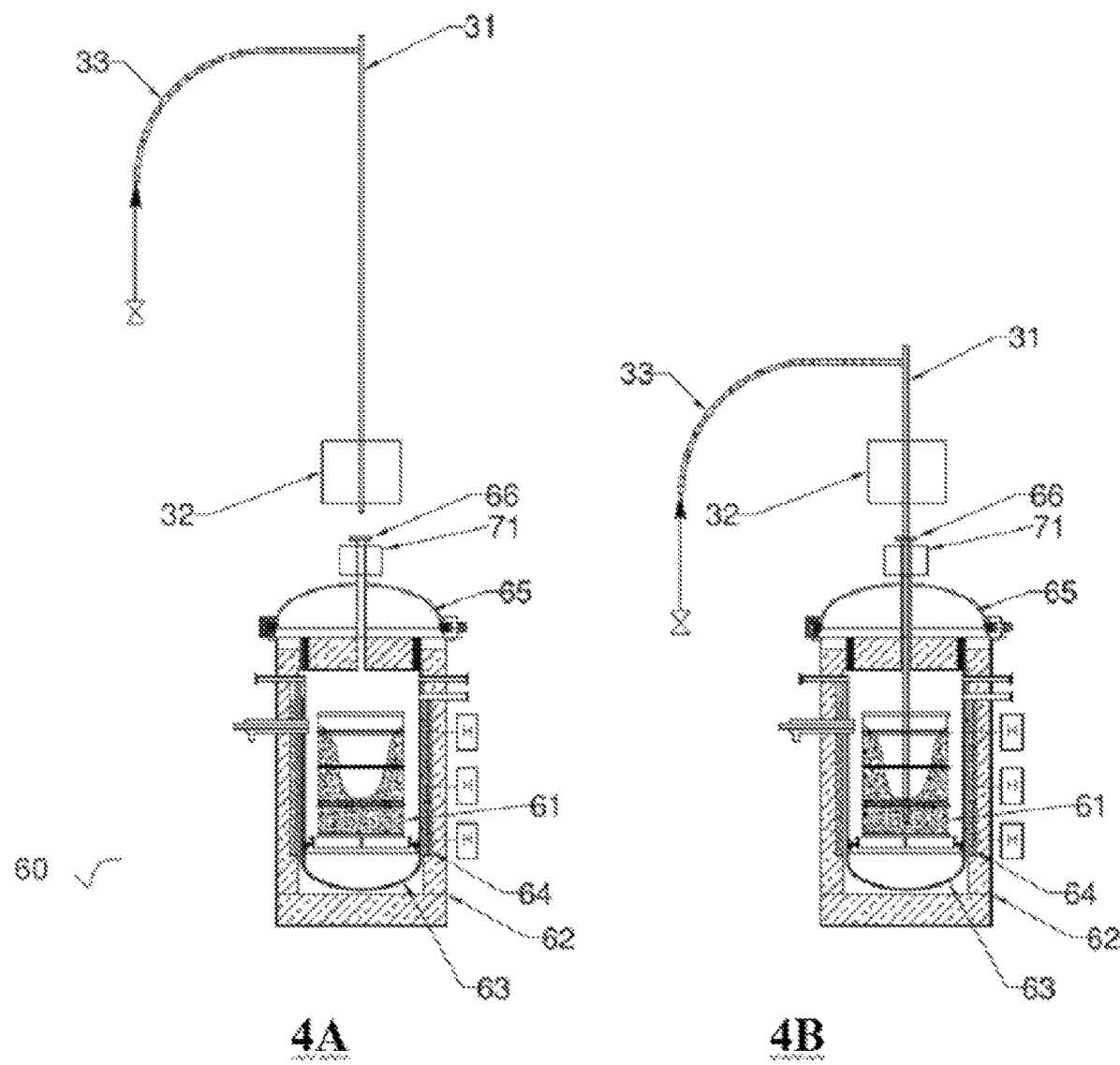
FIG. 4A and FIG. 4B (collectively, FIG. 4) are schematic illustrations of an exemplary lance designed to provide purge gas, and/or reactive materials, and/or encapsulating material, and/or directly measuring parameters to/of the waste inside the container. The lance is shown withdrawn and inserted into the waste. The waste container is depicted inside an exemplary autoclave used for thermal decomposition of waste in the container.

Referring to FIG. 4, there is shown an exemplary lance 31 which includes certain measurement or gas flow embodiments. Two views are shown; FIG. 4A is the lance 31 fully withdrawn, FIG. 4B is the lance 31 in place inside the waste. With the lance 31 in place, the inert gas purge is begun via the flexible hose 33 connected to the lance 31. The autoclave 60 is heated to begin thermal treatment. Lance temperature (and/or other parameter) indications are measured by one or more sensor devices 199 along with autoclave pressure and temperature indication, process off-gas instrument indications, and off-gas treatment system 90 indications to determine, by the instrumentation and control system 150, heat-up rates and hold times. In certain embodiments, reactive materials are added, under control of the instrumentation and control system 150, through the lance 31 to facilitate reactions within the waste. Conditions are monitored (e.g., using parameter measurements made by one or more sensor devices 199) by the instrumentation and control system 150 to determine the progress of the reactions (treatment). Once treatment is complete, the lance 31 is withdrawn. In certain embodiments, encapsulating materials are added through lance 31 to the waste.

Referring to FIG. 5A, there is shown an exemplary lance 200 which includes thermocouples 201 (types of sensor devices 199). Thermocouples 201 are used to measure temperature and consist of two wires of different metals connected at two points, a voltage being developed between the two junctions in proportion to the temperature difference. The signal wires for the thermocouples 201 are disposed in one or more channels 47 in the shaft 46 of the lance 200 and threaded through a sealed connection 202 at the top of the lance 200 to allow them to be connected to monitoring equipment (e.g. instrumentation and control system 150). In FIG. 5A, there is only one channel 47 in the shaft 46 of the lance 200, and the tip 44 of the lance 200 has approximately the same diameter as the diameter of the shaft 46. In certain embodiments, four thermocouples 201 are installed along the lance 200 at different levels (e.g., distance from the top along the length of the lance 200). More or fewer thermocouples 201 are contemplated, installed at levels along the lance 200 that reflect the characteristics of the waste. More than one thermocouple 201 can be installed at a single level. In one embodiment, at least four thermocouples 201 are installed in the waste region of the waste container 61, at least one thermocouple 201 is installed in the gas space above the waste but within the waste container 61, and at least one thermocouple 201 is installed in the space above the waste container 61 lid but within the autoclave 60.

Referring to FIG. 5B, there is shown an exemplary lance 300 which includes a single flow connection 302 and multiple injection ports 301 that are fed by one or more channels 47. In FIG. 5B, there is only one channel 47 in the shaft 46 of the lance 300, and the tip 44 of the lance 200 has approximately the same diameter as the diameter of the shaft 46. Inert purge gas, or reactive material, or encapsulating material is supplied via a flexible hose 33 connected to the single flow connection 302 at the top of the lance 310. In certain embodiments, four injection points 301 are installed along the lance 310. More or fewer injection ports 301 are contemplated, installed at levels that reflect the characteristics of the waste. For example, injection ports 301 for a reactive gas injected into a waste container 61 that contained resin would only be required near the bottom and perhaps a few inches above the bottom, as the waste residue, mostly carbon char with metal oxides, will have settled to the bottom of the waste container 61 following thermal decomposition. More than one injection port 301 can be installed at a single level. In certain embodiments, there will be at least two injection ports 301 at the bottom of the lance 310, located 180 degrees apart.

Figure 6:
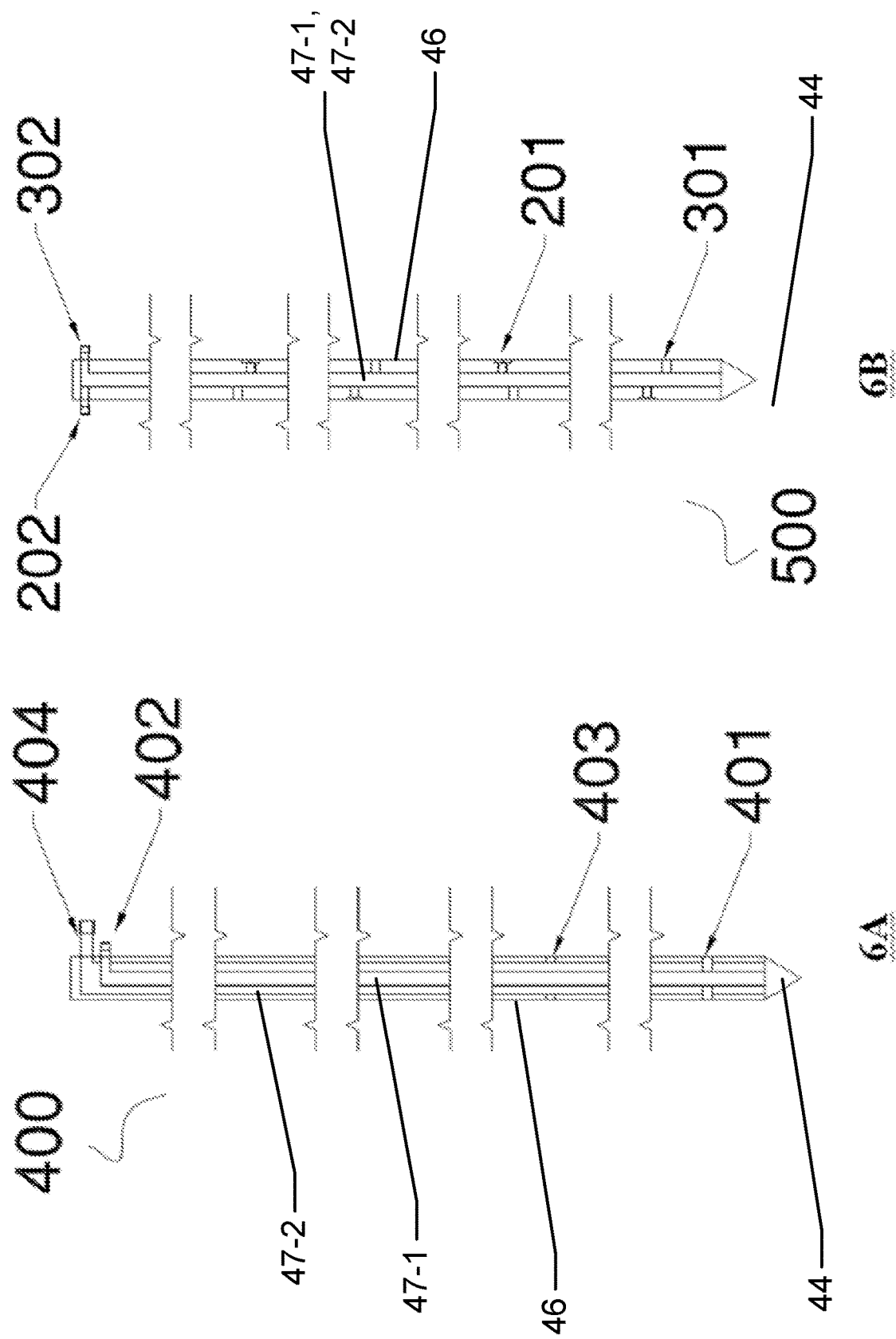
FIG. 6A and FIG. 6B (collectively, FIG. 6) are schematic illustrations of a lance designed to provide a path for multiple purge gas steams, and/or reactive materials steams, and/or encapsulating material steams to the waste inside the container; and an exemplary combination lance designed to perform simultaneously the function of measuring and providing directly the temperature of the waste inside a container and the function of providing purge gas, and/or reactive materials, and/or encapsulating material to the waste inside the container.

Referring to FIG. 6A, there is shown a schematic of an exemplary lance 400 which includes dual flow connections 402 and 404 and multiple injection ports 401 and 403. Channel 47-1 provides for the flow of fluid from flow connection 402 to injection port 401, and channel 47-2 provides for the flow of fluid from flow connection 404 to injection port 403. Also, the size (e.g., diameter) of channel 47-2 is larger than the size of channel 47-1. Inert purge gas, or reactive material, or encapsulating material is supplied via two separate flexible hose connections. As an example, hose 33 is depicted in FIG. 4 and FIG. 7. Multiple hoses each carrying its own material are contemplated with lances such as the lance 400 shown in FIG. 6A. The one or more injection ports 401 are supplied by flow connection 402 and injection ports 403 are supplied by flow connection 404. As depicted, one stream of injection material flows down a center tube while the other flows in the annular space between the central tube and the outer wall of the lance 400. Other methods for suppling multiple gas flows in a single lance are contemplated. Two different material flows can be supplied simultaneously with this embodiment of the lance 400. In FIG. 6A, the tip 44 of the lance 400 has approximately the same diameter as the diameter of the shaft 46. The comments on number and location of injection ports made for FIG. 5B are applicable.

Referring to FIG. 6B, there is shown a schematic of an exemplary lance 500 which includes a combination of thermocouples 201 and injection ports 301. The signal wires for the thermocouples are threaded through a sealed connection 202 at the top of the lance 500 to allow them to be connected to monitoring equipment (e.g. instrumentation and control system 150). Channel 47-1 acts as a conduit for wires from the thermocouples 201 to sealed connection 202, and channel 47-2 provides for the flow of fluid from flow connection 404 to injection port 403. Also, the size (e.g., diameter) of channel 47-2 is larger than the size of channel 47-1. Inert purge gas, or reactive material, or encapsulating material is supplied via a flexible hose 33 (as shown in FIG. 4) connected to fitting 302 at the top of the lance 500. In FIG. 6B, the tip 44 of the lance 500 has approximately the same diameter as the diameter of the shaft 46. The comments previously made on number and location of thermocouples and injection port are applicable. Other combination lances are contemplated.

Referring to FIG. 7, there is shown a schematic of an exemplary treatment system for a waste container 61. Lances 31, 200, 300, 400 and 500 have been previously described in the discussions of FIG. 2 through FIG. 6.

In this embodiment, the autoclave 60 is a dual-walled, cylindrical vessel, which includes an inner autoclave liner 63 and an outer autoclave vessel 62. The autoclave 60 further includes a purge gas supply 25 that introduces inert purge gases to the interior of the inner autoclave vessel 63. The autoclave vessel 63 may be constructed of a high-temperature-resistant alloy suitable for contact with thermal decomposition gases, which include acid gases, hydrocarbon gases, and evaporated water from the contents of waste container 61.

The outer autoclave shell 62 may be a pressure containment vessel that provides a secondary sealed barrier to the environment. The outer autoclave shell 62 may further include a refractory jacket cover, an insulation jacket cover, and a metal shell. In certain embodiments, the outer autoclave shell 62 is explosion resistant and designed to retain all gas expansion from over-pressure or off-normal events. An annulus between the autoclave inner liner 63 and the outer autoclave shell 62 (the annulus) serves as a dual containment barrier that will prevent loss of containment in the case of failure of the autoclave inner liner 63 integrity. A gas overpressure can be maintained in the annulus. As used herein, "overpressure" refers to pressure in excess of normal atmospheric or system operating pressure. Further, a loss-of-pressure alarm can be provided in the autoclave 60 that will indicate a failure of the autoclave inner liner 63 integrity, e.g. crack in a wall of the autoclave inner liner 63 or a poor seal between the autoclave inner liner and the annulus.

The autoclave 60 includes one or more nozzles. The one or more nozzles can be used for the insertion of lances 31, 200, 300; the supply of reactants and purge gas 21, 22, 23, and 25; the supply of an atomized water spray 24 and 25 (e.g., for cooling after treatment); directing autoclave gas to the off-gas treatment system; or overpressure relief. In certain embodiments, the purge gas is unheated.

Following thermal decomposition, the autoclave 60 and waste container 61 are partially cooled with an atomized water spray 24 and 25. The partially cooled waste container 61 is removed from the autoclave 60 to a staging area and allowed to cool to near ambient temperature. After cooling, the container may be compacted and placed in an overpack, or placed directly in an overpack without compaction. It is possible to re-assay the waste container 61 and/or reperform real-time radiography. The selection of final waste preparation options is dependent on the waste and the local disposal regulations.

The heat source for the autoclave 60 can be an indirect heat source using conductive or radiative heat transfer, such as one or more electrical heaters 64 that are external to the autoclave inner liner 63, but that provide heat to the interior of the autoclave inner liner 63. In one embodiment, the indirect heat source comprises electrical heaters that are ceramic-insulated and are located within the annulus formed by the autoclave inner liner 63 and the outer autoclave shell 62. The term "indirect heat source" refers to a source of heat that is external to the autoclave inner liner 63 and that provides heat to the interior of the autoclave inner liner 63. For example, "indirect heat source" may comprise source of heat that is external to the autoclave inner liner 63 and that provides heat to the interior of the inner liner. In one embodiment, the indirect heat source is combustion fired heat. When combustion fired heat is used, the inner liner 63 must be completely isolated from the combustion gas in the outer shell 62. An indirect heat source can be used to thermally decompose the containerized waste. Through the use of indirect heating, both the gas flow and the gas composition inside the autoclave 60 can be readily controlled. The use of direct heating with hot gases, for example, increases the volume of off-gas, as well as particulate carry out. The use of indirect heating that is external to the inner liner 63 of the autoclave 60 or internal to the outer shell 62, whereby the heating is performed largely due to radiant heat transfer without combustion of the wastes, renders the process a non-incineration process, because there is no open flame combustion in the autoclave or off-gas stream. As mentioned, heaters that are internal to the inner liner 63 can be employed. Internal heaters will include heater tubes or sleeves so that there is a barrier between the electrical heating elements and the contents of the inner liner.

The use of an optional internal electrical heater that is located within inner liner 63 is also contemplated for use in another exemplary embodiment. In the case that electrical heaters are located within the inner liner 63, these heaters may be sheathed in an alloy tube to prevent direct contact of the heaters with the thermal decomposition gases, such as organics, sulfur-containing compounds, including SOx, and nitrogen-containing compounds, including NOx. It is preferred that these heaters include heater tubes or sleeves so that there is a barrier between the electrical heating elements and the contents (e.g. the waste container 61) of the inner liner 63.

Optionally, combustion-fired heat that is external to the autoclave inner liner 63 and within the annulus can be used.

Current methods that employ thermal decomposition for the processing of wastes in waste containers 61, typically 55-gallon drums, heat the wastes directly through internal combustion fired heat or through the introduction of hot gases into the autoclave 60. Through the use of indirect heating for an exemplary embodiment, both the gas flow and the gas composition inside the autoclave 60 can be more readily controlled. The use of direct heating with hot input gases, for example, dramatically increases the volume of off-gas, as well as particulate carry out. Further, the use of heating that is external to the inner liner 63 of autoclave 60 renders the process a non-incineration process, because there is no open flame combustion in autoclave 60. The use of indirect electrical heaters is also advantageous over other direct heating methods, in that the heaters do not introduce hot gases to the system as opposed to internal combustion type methods. Moreover, various state and federal regulations that apply to combustion fired heat are not applicable to electrical heaters.

The autoclave 60 can also be adapted with features for managing the temperature within the outer shell 62. For example, a thermocouple instrument can be provided to control the temperature of autoclave 60. In order to provide for thermal growth of inner liner 63 as compared with the fixed outer shell 62 during thermal decomposition, a thermal expansion element can be included in the annulus between the autoclave inner liner 63 and the outer autoclave vessel 62. Optionally, an insulation layer is provided within the annulus to prevent the passage of heat out of the inner liner 63. As a further safety provision, in certain embodiments, both the thermocouple instrument and the electrical heaters 64 are adapted so that they can be removed and replaced without having to enter the autoclave 60.

To begin the in-container waste processing method of the present invention, an intact waste container 61 containing waste is introduced into the enclosure 1 via an airlock 11. A roller table is contemplated for movement through the airlock. Generally, if the waste container 61 requires placement in an overpack, such action will already have occurred, and the waste container 61 will arrive with a clean exterior with respect to contamination. If required, a waste container 61 washdown and washdown fluid collection system, along with an overpacking capability are contemplated as either part of the airlock 11 or part of the enclosure 1. Additional airlocks separating the washdown and overpack system from other systems in the enclosure 1 are contemplated. Once in the enclosure the waste container 61 is moved using an overhead crane 12. Use of roller tables and other suitable transfer devices in concert with the overhead crane 12 is contemplated. If not characterized before placement in the enclosure 1, the waste container 61 is then sequentially placed in the real-time radiography chamber 13 and the non-destructive assay chamber 14. After characterization, the waste container 61 is transferred into the inner liner 63 of the autoclave 60 and the autoclave lid 65 is closed to seal the autoclave 60.

Each lance (31, 200, 300, 400 or 500) is installed through lance drive 32 and into lance nozzle 66, as described above. If a combination penetrating and monitoring parameter measurement and gas flow injection lance 500 (as from FIG. 6B above) is used, then the lance 500 is left in place for waste container 61 thermal treatment. Otherwise, the penetrating lance 31 is withdrawn in preparation of installation of the next lance (200, 300, 400 or 500). For this discussion, it is assumed that a combination parameter measurement and gas flow injection lance 500 is inserted. With the combination parameter measurement and gas flow injection lance 500 in place, inert gas purge is begun, and the autoclave heaters 64 are heated to begin thermal treatment of the autoclave 60. Lance 500 temperature indications are monitored by one or more controllers 104 in communication with the sensor devices 199, along with autoclave pressure and temperature measurements, off-gas instrument indications 9 and 10, and other off-gas treatment system 90 measurements to determine heat-up rates and hold times.

As the autoclave 60 is heated to thermal decomposition temperature, ranging up to about 800° C., various reactions occur. Organics with low to medium boiling points will readily evaporate and form organic vapors. Organics with high boiling points, such as high molecular weight polymers and plastics, melt if solid and then the hot liquids thermally decompose. In general, exposure to temperatures above 450° C. causes the organic polymer structure to break. The long carbon-hydrogen chain molecules break into smaller, more volatile organics, thereby gasifying the organic constituents. The thermal breakdown of the long polymers leaves behind a carbon-rich, inorganic char that is inert and non-volatile. This carbon residue is an inert inorganic residue that has only small hydrogen content. The thermally decomposed residues are, therefore, practically inert to alpha particle interaction. In certain embodiments, wherein the waste comprises sealed waste containers 61, the sealed waste containers 61 are breached.

As the organics are vaporized or thermally decomposed into gases, low-flow gas purge from the lance 500 helps move the gas out of the waste container 61 into the autoclave inner liner 63. The gas through the lance 500 is kept at a low-flow rate to prevent disturbing the waste solids while at the same time effectively purging gases from the waste container 61. Purge gas 25 entering through autoclave purge nozzle 69 sweeps the gases in the inner liner 63 through autoclave exit nozzle 67 and on to the off-gas treatment system 90.

When the waste reaches the appropriate final temperature, as indicated by the thermocouples 201 in the lance 500, the autoclave heaters 64 are adjusted to hold the temperature. The length of hold time is determined by measuring the process off-gas flow and composition. When the flow is steady and equal to the input of inert purge gas, and there is no indication of organics in the process off-gas, then the thermal decomposition is complete.

Before cooling the autoclave 60, the lance 500 is used to inject controlled quantities of reactive materials, such as gases 21 and steam 23. For example, the injection of steam 23 is used to reduce carbon char by reacting with the steam to produce CO, $CO_2$, and $H_2$. The steam 23 may also be used to oxidize metals in the waste container 61. The rate of injection of steam 23 is controlled to limit temperature rise in the waste container 61. The thermocouples 201 in the lance 500 provide early indication of exothermic oxidizing reactions. Steam can be reduced or completely stopped to slow or stop the oxidizing reactions. Other gases, liquid or solids carried by the gases 21 may be injected into the waste container 61 to react with the waste and produce stable, non-reactive solids.

After thermal treatment of the waste in waste container 61, the autoclave heaters 64 are de-energized and cooling of the autoclave 60 and waste container 61 begins. Direct cooling of a finely atomized spray of water droplets that have a very high surface area is used to increase rate of cooling. Water source 24 and nitrogen source 25 enter through the autoclave spray nozzle 70. The fine mist of water droplets quickly adsorbs heat from the gases in the autoclave 60, from the waste container 61, and from the inner walls of the autoclave vessel 63. The water droplets evaporate into steam that is carried out of the autoclave 60 through the autoclave outlet nozzle 67 to the off-gas treatment system 90. The spray is secured before any temperature measure in the autoclave 60 approaches 100° C. This direct cooling method maintains surfaces dry in the autoclave 60 and provides cooling that can be as much as an order of magnitude faster than indirect cooling and/or allowing the waste container 61 or container to cool without any form of forced cooling.

When the waste container 61 is ready to be removed, the combined parameter measurement and reactive material flow lance 500 is removed. If desired, the lance 500 can be left in place or an alternative lance 310 inserted that is designed to inject macro-encapsulation material into the waste container 61 to physically stabilize the waste product, which can contain fine particles or even be mostly fine particles.

When all lances are removed, the autoclave lid 65 is opened and the treated waste container 61 is removed. In one embodiment, the treated waste container 61 can be compacted 121 and the pucks placed in an overpack container 122, or the treated waste container 61 can be placed directly in an overpack container 122. There are many options for the further processing of the container in preparation for disposal. These options are well known to those skilled in the art and any one or combination of them is contemplated.

During treatment of the waste container 61 in the autoclave 60, the off-gas exiting through the autoclave outlet nozzle 67 is further processed by the off-gas treatment system 90. The gases are directed to the off-gas treatment system 90 via the barrier filter 8. The barrier filter is a ceramic filter capable of operating at high temperature. While most of the radionuclides remain in the waste container 61, any non-volatile radionuclides the exit the autoclave 60 must pass through the barrier filter 8. The barrier filter 8 is expected to capture >99.9% of the radionuclides in the process off-gas from the autoclave 60. The transfer piping between the autoclave 60 and the off-gas treatment system 90, including the barrier filter 8 is heated so that high boiling point organics in the off-gas, i.e., tars and waxes do not condense in the pipes.

As illustrated in FIG. 7, the off-gas treatment system 90 includes a thermal oxidizer 91. A standard combustion oxidizer is shown, but use of other thermal oxidizer, such as a catalytic converter or a ceramic matrix, or use of a steam reformer operated as an oxidizer is contemplated. The thermal oxidizer 91 fully converts the organics present in the incoming off-gas stream to carbon dioxide and water vapor, the acid gases from the gases released from the autoclave 60 pass through the thermal oxidizer 91 and are neutralized by a downstream quencher/scrubber 92. The quantity and makeup of the acid gases depend on the type and quantity of plastics and other organics in the waste container 61. For example, polyvinyl chloride (PVC) contains significant quantities of chlorine that become volatized in the autoclave 60. Quencher/scrubber 92 instantly cools the hot thermal oxidizer 91 off-gases, and the acid gases are adsorbed by a scrubber water solution. In one embodiment, the scrubber solution is neutralized by the injection of metered quantities of caustic materials 107, with added water 108, if appropriate, to form stable salts, such as NaCl, $Na_2SO_4$, and NaF. The salt solution is continuously recirculated into quencher/scrubber 92, preferably through a pump 93. The salts generated are mainly NaCl and $Na_2SO_4$ from the thermal decomposition of chlorinated organics, plastic, and rubber in the containerized waste, and contain <0.01% of the total radionuclides of the incoming containerized waste.

The gas stream leaving quencher/scrubber 92 is largely made up of water vapor, carbon dioxide, nitrogen and oxygen. The gas stream is sent through a demister 96 for the removal of liquid droplets. The droplets are directed back to the quencher/scrubber (not shown). The gas steam then passes through an off-gas filter 97, a HEPA filter 99, an off-gas blower 100 and is directed to a stack 101. The stack 101 gas is continuously measured by one or more sensor devices 199 for any trace radionuclide particles 104 and for other constituents, e.g., NOx, SOx, CO, and particulate material 105. A recycle loop is provided to heat the gas entering the off-gas filter 97 to avoid condensation of water in the filter. The recycle line includes a blower 102, an electrical heater 103, and a mixing chamber 106.

The described method generates very little secondary waste because most of the secondary waste streams can themselves be collected and fed into the autoclave for thermal decomposition and volume reduction. For example, chemicals, oils, and solutions that may be used for maintenance and decontamination activities can be thermally decomposed to produce an inert residue that can be packaged and disposed. Further, personal protective equipment can also be thermally decomposed and packaged. As previously described, the scrubber 92 salts are dried in the autoclave 60 and packaged for disposal.

Methods for the Treatment of Containerized Waste

In one embodiment of the invention, a method for the treatment of containerized waste comprises: (i) placing a waste container 61 containing waste into an autoclave 60; (ii) sealing the autoclave; (iii) puncturing the waste container 61 with a lance 31; (iv) heating the autoclave 60 to thermally decompose the waste.

In one embodiment, the method further comprises penetrating the waste with a lance 31. In one embodiment, the method further comprises providing a purge gas to the waste through the lance 31. In one embodiment, the method further comprises providing reactive materials to the waste through lance 31. In one embodiment, the method further comprises measuring the temperature of the thermal decomposition of the waste with a lance. In one embodiment, the method further comprises injecting encapsulating material through the lance 31 into the waste. In certain embodiments, the method comprises using two or more lances 31. In certain embodiments, the method comprises using one or more multifunction lances 31.

In one embodiment, the waste container 61 is heated by indirect heating of the autoclave 60. In one embodiment, reactive materials (e.g., reactive gases) are added to the waste in the waste container 61 through one or more lances 31. In certain embodiments, reactive materials including gases, liquids or solids or combinations thereof, are added to the waste in the waste container 61 through one or more lances 31. Reactive materials may include, but are not limited to: steam, carbon dioxide, air, oxygen and the like. In one embodiment, encapsulating material is added to the waste in the waste storage container 61 through one or more lances 31.

In certain embodiments, the method thermally decomposes containerized wastes and removes or stabilizes reactive materials from the containers. In certain embodiments, the method further comprises, processing of the treated waste and waste container 61 by a product handling system. In certain embodiments, the method further comprises subjecting the gases (off-gas) produced by the heating of the waste to a barrier filter 8 and off-gas treatment system 90.

It will be apparent to those skilled in the art of processing containerized wastes that many modifications and substitutions can be made to the embodiments described above without departing from the spirit and scope of the present invention.

We claim:

1. An apparatus for the treatment of waste, the apparatus comprising:
   an autoclave comprising at least one heater;
   a container disposed within the autoclave, wherein the container comprises at least one container wall that forms a container cavity, wherein the waste is disposed within the container cavity;
   at least one lance movably disposed in at least one aperture that traverses the autoclave, wherein the at least one lance is configured to create at least one piercing that pierces the at least one container wall; and
   a lance apparatus positioned external to the autoclave that controls:
      the insertion of the at least one lance into the at least one aperture that traverses the autoclave and into the container via the at least one piercing; and
      removal of the at least one lance from the autoclave and the at least one aperture.

2. The apparatus of claim 1, wherein the at least one lance comprises a tip, wherein the tip of the at least one lance, when the at least one lance is inserted through the at least one container wall, penetrates the waste in the container cavity.

3. The apparatus of claim 2, wherein the at least one heater of the autoclave generates heat that is absorbed by the waste while the tip of the at least one lance penetrates the waste.

4. The apparatus of claim 3, wherein the at least one lance comprises at least one first sensor device that measures a first temperature of the waste while the waste absorbs the heat.

5. The apparatus of claim 4, wherein the at least one lance further comprises at least one second sensor device that measures a second temperature within the autoclave and outside the container while the waste absorbs the heat.

6. The apparatus of claim 3, wherein the at least one lance comprises at least one first injection port that is configured to inject a first fluid into the waste while the tip of the at least one lance penetrates the waste.

7. The apparatus of claim 6, wherein the first fluid comprises a reactive gas.

8. The apparatus of claim 6, wherein the at least one lance further comprises at least one second injection port that is configured to inject a second fluid into the waste while the tip of the at least one lance penetrates the waste.

9. The apparatus of claim 1, wherein the at least one aperture comprises one or more seals and one or more isolation devices to prevent leakage through the at least one aperture from the autoclave when the at least one lance is inserted into the autoclave.

10. The apparatus of claim 1, further comprising:
    a waste feed system that places the container inside the autoclave.

11. The apparatus of claim 1, further comprising:
    an off-gas treatment system that:
       receives off-gas from the container after the waste is exposed to heat generated by the at least one heater of the autoclave; and
       processes the off-gas.

12. The apparatus of claim 11, further comprising:
    a filter disposed between the autoclave and the off-gas treatment system, wherein the filter filters the off-gas.

13. The apparatus of claim 1, further comprising:
    a product handling system that processes the waste after the waste has been exposed to heat generated by the at least one heater of the autoclave and at least one reagent introduced to the waste through the at least one lance.

14. The apparatus of claim 1, wherein the insertion of the at least one lance into the autoclave by the lance apparatus and the removal of the at least one lance from the autoclave by the lance apparatus occurs during the treatment of the waste, and wherein the lance apparatus further controls:
    injection of one or more fluids through the at least one lance into the waste in the container.

15. An apparatus for the treatment of waste, the apparatus comprising:
    an autoclave comprising at least one heater;
    a container disposed within the autoclave, wherein the container comprises at least one container wall that forms a container cavity, wherein the waste is disposed within the container cavity; and
    at least one lance movably disposed in at least one aperture that traverses the autoclave, wherein the at least one aperture comprises one or more seals and one or more isolation devices to prevent leakage through the at least one aperture from the autoclave when the at least one lance is inserted into the autoclave, wherein the at least one lance is configured to create at least one piercing that pierces the at least one container wall.

16. The apparatus of claim 15, further comprising:
a lance apparatus positioned external to the autoclave that controls:
the insertion of the at least one lance into the at least one aperture that traverses the autoclave and into the container via the at least one piercing during the treatment of the waste; and
the removal of the at least one lance from the autoclave and the at least one aperture during the treatment of the waste.

17. The apparatus of claim 15, wherein the waste comprises solid waste.

18. The apparatus of claim 15, wherein the one or more isolation devices comprises a lower valve and an upper valve that are open while the at least one lance is positioned in the autoclave, and wherein the one or more seals comprises a seal located in between the lower valve and the upper valve.

19. The apparatus of claim 18, wherein as the at least one lance is movably disposed out of the autoclave via the at least one aperture, the lower valve and the upper valve are closed to isolate the autoclave.

20. The apparatus of claim 16, further comprising a second lance, wherein the lance apparatus positioned external to the autoclave further controls:
the insertion of the second lance into the at least one aperture that traverses the autoclave during the treatment of the waste, after the removal of the at least one lance from the autoclave and at least one aperture.

* * * * *